United States Patent [19] [11] 3,774,428
Derry et al. [45] Nov. 27, 1973

[54] THERMALLY INSULATED BUILDING MATERIAL AND METHOD AND MEANS FOR THE MANUFACTURE THEREOF

[76] Inventors: Carl E. Derry, 400 W. Orangethorpe, 105B, Fullerton, 92632, William A. Childs, 3007 W. Chandler, Burbank, both of Calif.

[22] Filed: Sept. 21, 1971

[21] Appl. No.: 181,703

[52] U.S. Cl. .................. 72/46, 29/33 C, 29/527.4, 117/66, 118/44
[51] Int. Cl. .............................................. B05c 9/08
[58] Field of Search ....................... 72/46; 29/527.4, 29/33 C; 118/44; 117/66

[56] References Cited
UNITED STATES PATENTS
3,397,561  8/1968  Youssi ................................ 72/46 X
3,412,589  11/1968  Gartrell ................................ 72/46

Primary Examiner—Francis S. Husar
Attorney—Philip M. Hinderstein

[57] ABSTRACT

There is disclosed a thermally insulated, fire-resistant building material, a method for manufacturing the building material, and apparatus for use in such manufacture. The building material comprises a base layer of substantially rigid, lightweight, foamed, plastic material, having a hard crust on opposite sides thereof, and a face layer of weather-resistant sheet material bonded to one side of the base layer, the surface of the face layer having a pattern therein simulating the surface grain of a naturally-occurring building material. According to one embodiment of the invention, the building material is made in a continuous, elongated sheet and then cut into panels simulating a shingle or shake type structure, which panels may be used for roofing, exterior siding or interior paneling. The method of fabrication consists of providing the face layer of sheet material in continuous ribbon form, injecting the plastic material onto the face layer in a fluid state while moving the face layer linearly in a horizontal plane, permitting the plastic material to harden on the face layer to form a substantially rigid base layer which is bonded to the face layer, and cutting the strip of finished building material into desired lengths.

24 Claims, 18 Drawing Figures

United States Patent
Derry et al.
[11] 3,774,428
[45] Nov. 27, 1973
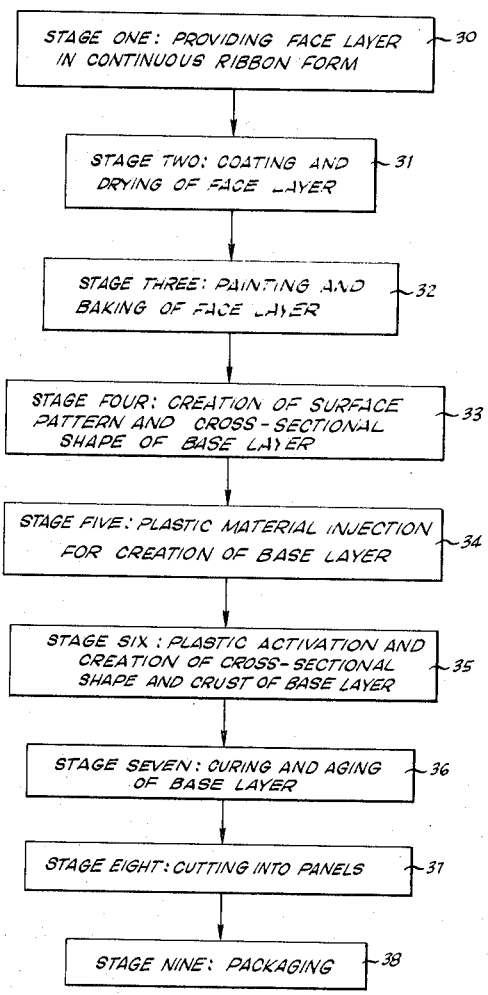

INVENTORS
CARL E. DERRY
WILLIAM A. CHILDS
BY
ATTORNEY

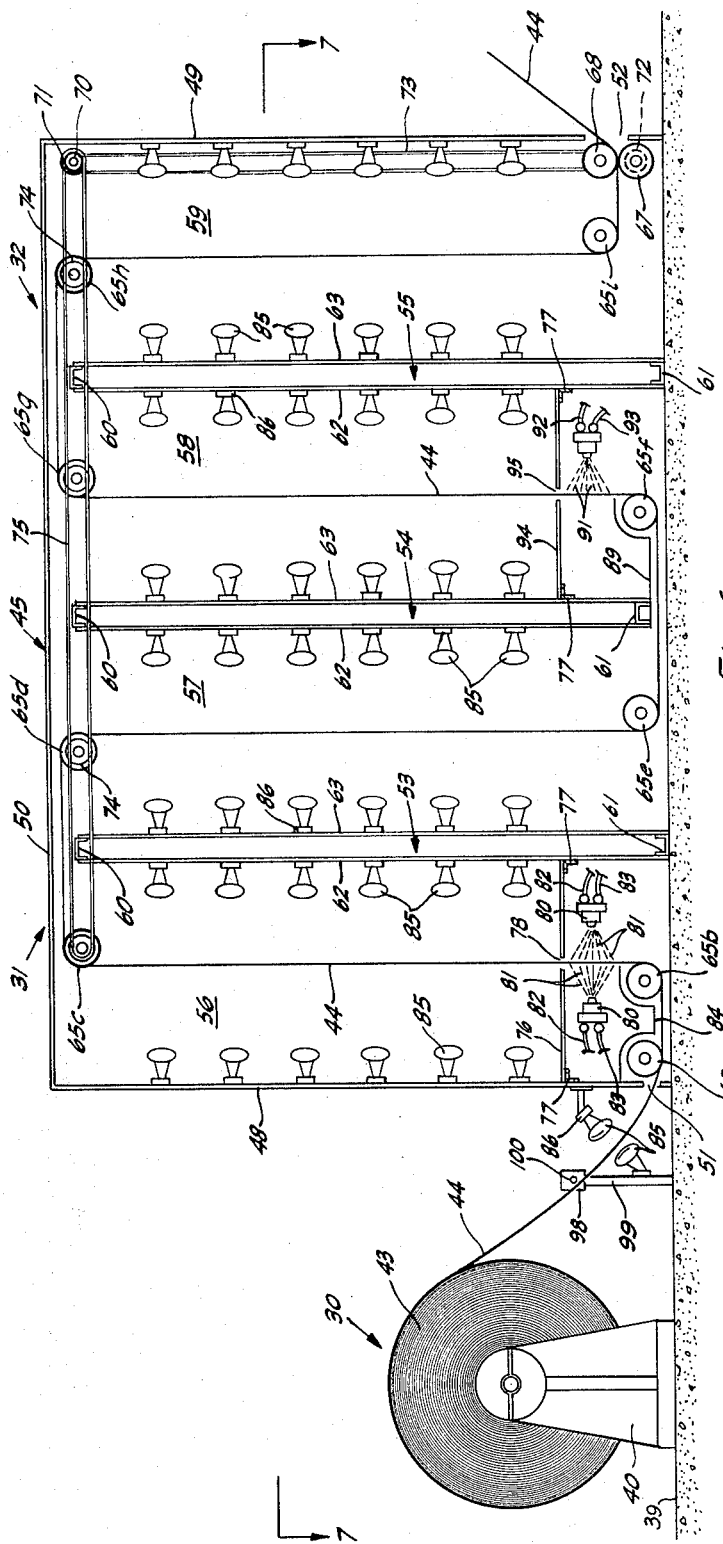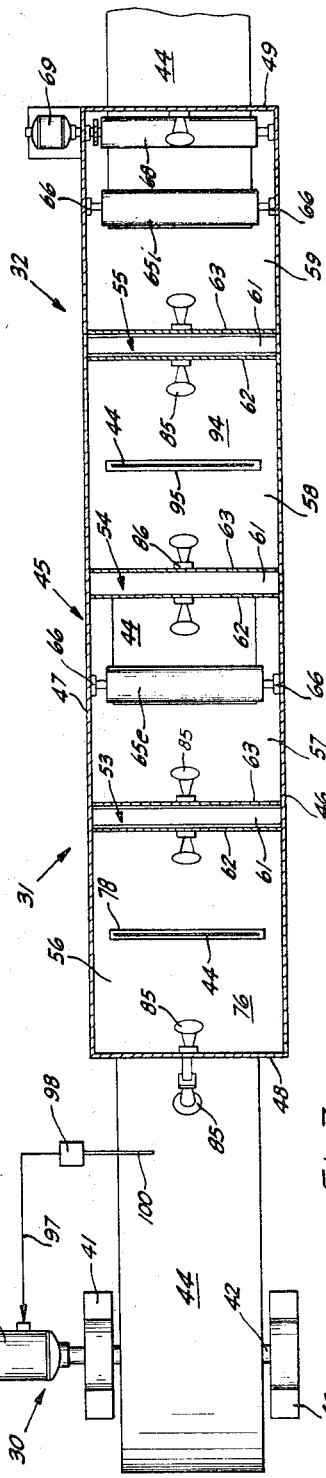

INVENTORS
CARL E. DERRY
WILLIAM A. CHILDS
BY
ATTORNEY

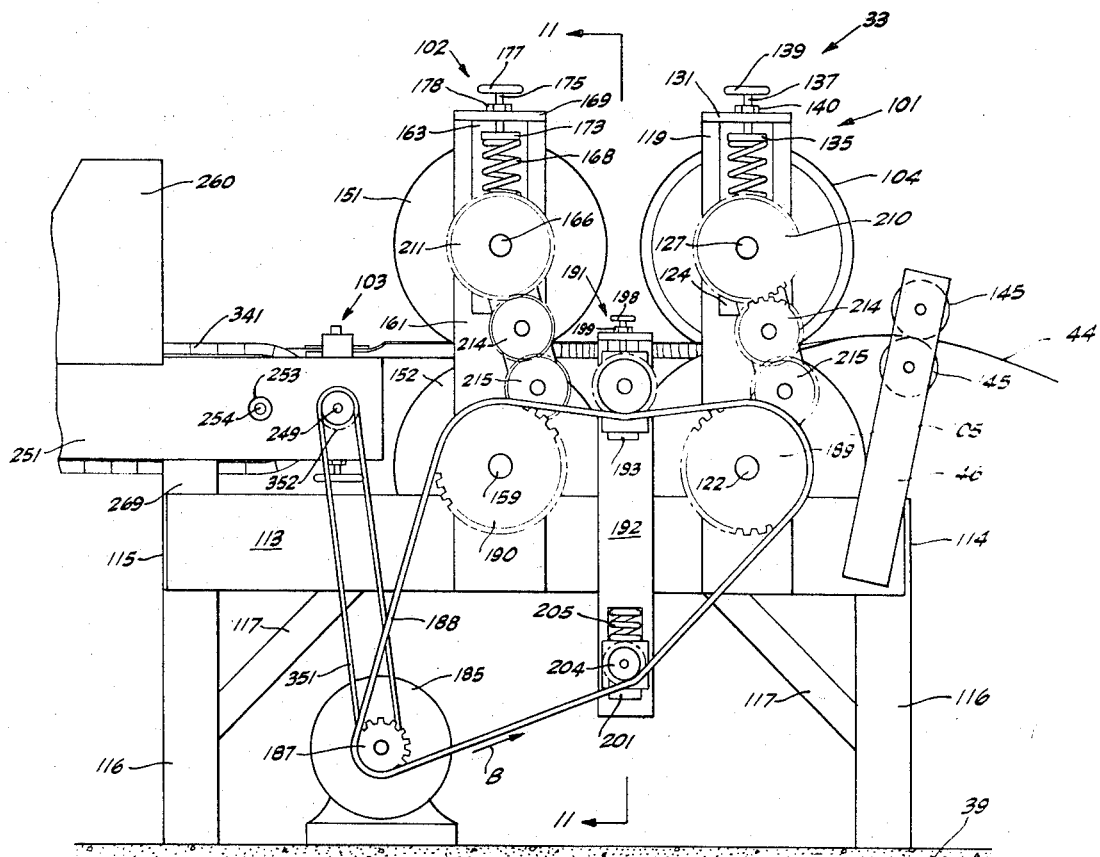
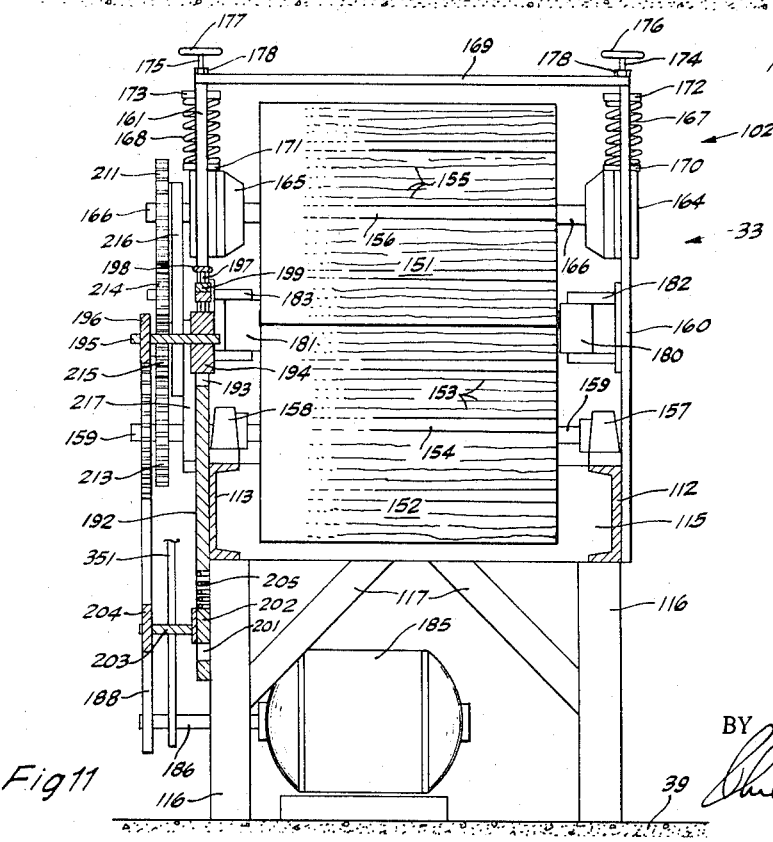
Fig 10
Fig 11
INVENTORS
CARL E. DERRY
WILLIAM A. CHILDS
BY
ATTORNEY

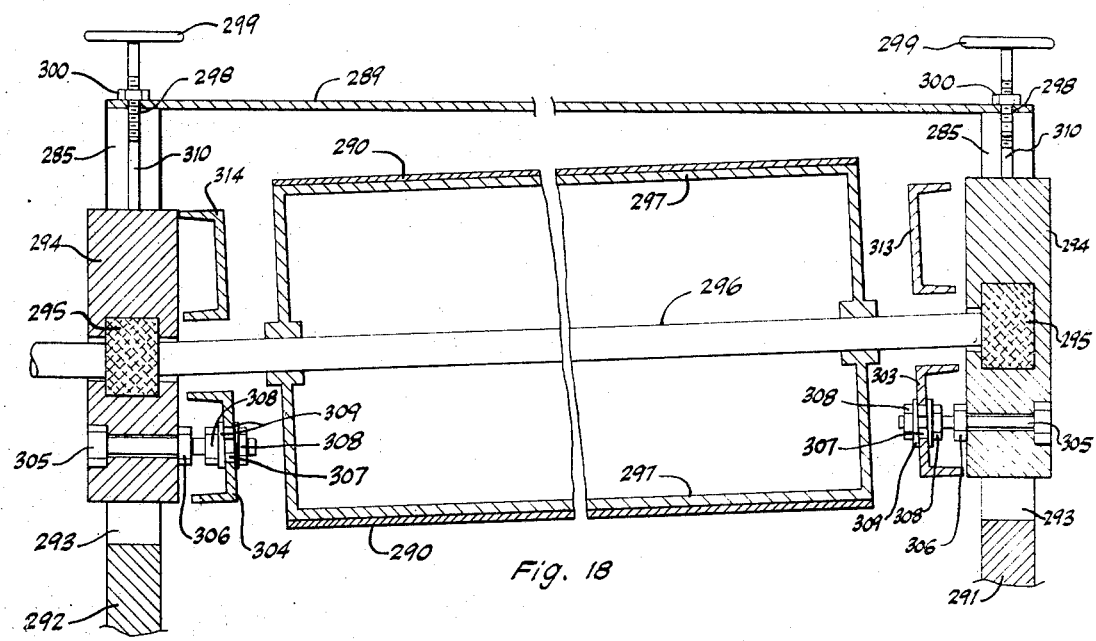
Fig. 18
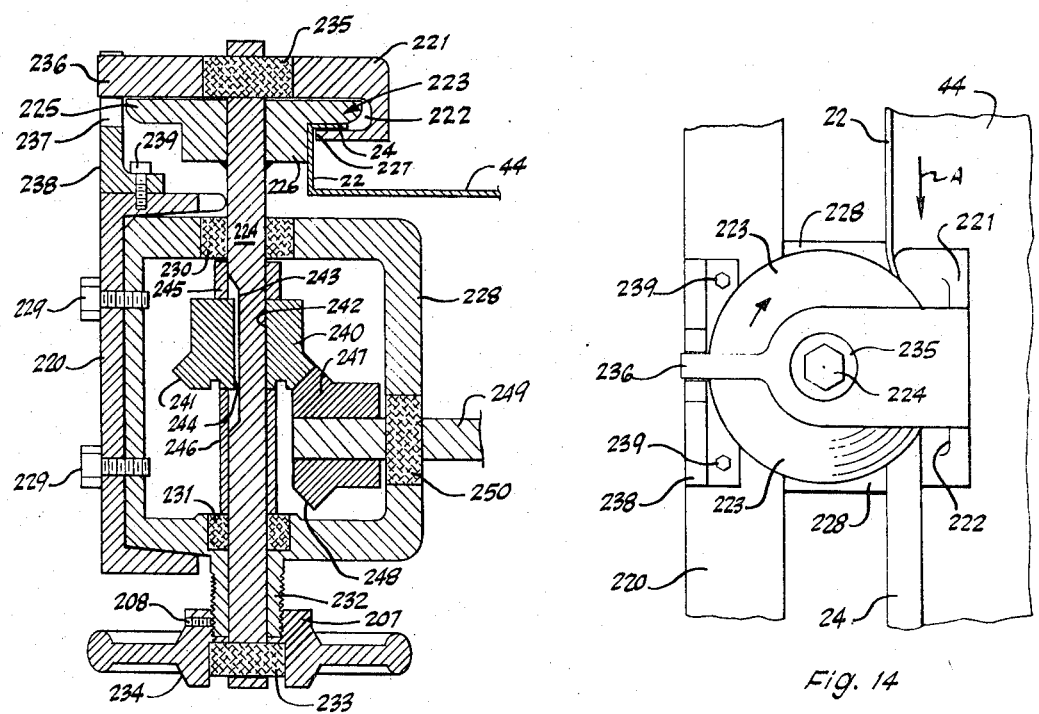
Fig. 13
Fig. 14
INVENTORS
CARL E. DERRY
WILLIAM A. CHILDS
BY
ATTORNEY

THERMALLY INSULATED BUILDING MATERIAL AND METHOD AND MEANS FOR THE MANUFACTURE THEREOF

BACKGROUND OF THE INVENTION

1. Field of the Invention

The present invention relates to synthetic building materials and, more particularly, to a method and means for manufacturing a thermally insulated, fire-resistant building panel structure for roofing, exterior siding, interior paneling, and other equivalent exterior and interior building uses.

2. Description of the Prior Art

In the construction industry generally and, more particularly, in the construction of single family homes, multiple family dwellings, mobile homes, commerical establishments, and the like, wood is a basic building material. Wood is used in the framing, in roofing materials, in exterior siding, and in interior paneling. In spite of this heavy reliance on wood, it is becoming increasingly more evident that many problems are associated with such use. In the first instance, it is a well known fact that sources of wood building materials have diminished to a critical stage. According to a leading national association, in 1969 an estimated 200,000 homes were not built because of lumber and plywood shortages. With an average of 11,000 board feet of lumber for each single family unit, this amounts to 2,200,000,000 board feet of lumber short of requirements.

The normal life span for the average wooden roofing material, as used in multiple shingle or shake type structures, is 15 to 20 years. Since the average dwelling exists for a substantially longer period of time, the average roof must be regularly repaired or entirely replaced.

One of the most significant problems with wooden building materials is that wood is one of the most flamable materials that exists. During summer months, and especially in arid or semi-arid climates, wooden roofs and exterior siding become very dry and subject to being ignited easily and rapidly.

Existing wooden roofing materials and paneling suffer from the disadvantage of providing no thermal insulation whatsoever. As a result, between exterior and interior walls, it is common to use spun glass, cork or other materials for insulation. One of the particular disadvantages of using separate insulation in side walls is that the insulation settles and allows heat to escape in the winter and to enter in the summer. In addition, such insulation is not always effective. With respect to roofing materials, it is most common not to use any insulation at all. This is so in spite of the fact that one of the major sources of fires is from combustion caused by heat build-up in poorly ventilated attics. Existing roofing structures, in addition to providing no thermal insulation, provide essentially no insulation from overhead noise such as produced by aircraft and the like.

The weight of a roofing material is a big factor in building construction. The heavier the roofing material, the stronger a substructure is required to support the weight. In addition to supporting the initial weight of the roof, the substructure must also consider the weight problem from the elements, such as snow accumulation and earthquake and hurricane forces. Since most wooden roofing materials are heavy, the substructure must be substantial. In addition, individual shingle or shake type roofs are subject to substantial damage from wind and earthquakes.

The original cost of all roofing materials is most often the determining factor when choosing a roofing material. In addition, installation costs vary considerably. The heavier the material, the sturdier the substructure required, so the cost increases proportionally. The heavy rustic split-type wood shake shingles are not only expensive in original costs, but installation is slow, one shingle at a time, which substantially increases installation costs.

Many other minor problems are present with conventional wood shake and shingle materials. The individual shingles present handling problems in addition to the before-mentioned installation problems. In addition, if a section of roof or siding is damaged, each individual shingle must be replaced. Finally, there are many areas where insurance companies will not issue any insurance coverage on roofing other than fireproof or retardant materials. This limits builders to a very poor selection of roofing that will be compatible to their particular design.

In order to solve one or more of these problems, it has been proposed to use other materials for roofing, siding, and paneling. For example, it has been proposed to use concrete or asphalt compositions, brick, earthen tile, cement tile, slate, and aluminum shingles. It has also been proposed to use aluminum siding for paneling. However, while some of these materials solve some of the prolems mentioned above, none are effective in solving any significant number thereof.

On the one hand, materials such as tile, concrete, slate or other earthen materials, are effective in increasing the life span of the structure and also provide some fire retardation. However, none of these materials provide any high degree of insulation although aluminum siding does provide reflection. The materials provide little or no sound proofing and are, invariably, of greater weight, requiring extra substructure to support the weight, as well as snow accumulation, etc. In addition, the heavier materials are more subject to damage from wind or earthquakes. The concrete and earthen materials do not have the same desirable appearance as that of heavy shake shingles although the costs of original purchase and installation are substantially greater. Because of the increased weight, there are substantial problems in handling and insulation, as well as in repair.

SUMMARY OF THE INVENTION

According to the present invention, there is provided a building material for roofing, exterior siding, interior paneling or other equivalent exterior and interior uses which is effective in solving or minimizing all of the problems discussed above. The present building material uses new, highly available, synthetic materials that alleviate, in great measure, the critical demand for wooden building materials. The life span of the present material is substantially greater than that of wooden structures, estimated to exceed 40 years. The present building material is fire-resistant and self-extinguishing in addition to producing no toxic fumes. The present building material has a high degree of thermal insulation to both heat and cold. When used as a roofing structure, the present building material not only blocks the solar heat and cold, but prevents penetration into the attic structure of a home. As a result, the attic below a roof using the present building material remains cool and, when properly ventilated, acts as a cooling unit so that the ceilings in the rooms below remain cool. Since there is no need to insulate the attic floor, this represents a large savings to the builder while still giving the home owner a cooler home.

The present building material uses a polyurethane closed cell foam which has been scientifically proven to be one of the best materials for deadening sound. The soundproofing effect of the present building material is approximately equal to three feet of solid brick. The present building material may be constructed to simulate the surface grain and appearance of any naturally-occurring building materials such that any type of roofing pattern can be duplicated. However, the preferred embodiment will be described with respect to the heavy rustic shake shingle because it is applicable to any home design and it is most preferred by home owners and builders.

The present roofing material is extremely lightweight, will stand more punishment without damage, and will be much less apt to collapse from a quake shock. In snow areas where there is the weight build-up factor to be considered, the present building material used for roofing is so much lighter than other roofing materials that it will support the difference in weight between itself and heavier materials with the normal substructure. The present building material when used for roofing weighs approximately 40 pounds per 100 square foot coverage, compared to approximately 300 pounds per 100 square foot coverage for heavy wood shake shingles and 600 pounds per 100 square foot coverage for tile or slate. Yet, the present roofing material is exceedingly strong and will withstand as much abuse as any other roofing material and even more as other roofs age and shingles begin to curl, which is not the case with the present building material.

The present building material, in addition to all of the other advantages, will prove to be the most inexpensive in the long run. Not only is the present synthetic building material originally less expensive than existing materials, but the extra long life span, the improved insulation and soundproofing, the fire-resistance and ease of installation, all combine to decrease costs.

The present building material is so lightweight that it is easily handled and installed and no special equipment is necessary to hoist the packages onto a roof. A preferred embodiment of building material consists of panels approximately 4 foot in length which will make installation much faster than that for individual shingles, thus cutting the costs of installation to at least one-third of that of any other material. If the roof is damaged from falling objects, the damaged portion can be easily repaired by replacing it with a new panel. In addition, holes up to three or four inches in diameter can be repaired by filling them with resin plastics and repainting them with matching existing colors. Finally, with the above advantages, the present building material should offer the home owner a significant decrease in insurance rates.

Briefly, the present building material comprises a base layer of substantially rigid, lightweight, foamed, plastic material, having a hard crust on opposite sides thereof to give such base layer a high degree of rigidity and strength. The building material also includes a face layer of weather-resistant sheet material, such as aluminum, bonded to one side of the base layer, the face layer having a pattern therein simulating the surface grain of a naturally-occurring building material, such as heavy shake shingle. The exterior surface of the face layer is coated with a fire retardant paint, in natural colors, which is baked on for long life and color fastness. Any type of roofing material can be duplicated in the aluminum. According to a preferred embodiment of the invention, the building material is made in a continuous, elongated sheet and then cut into panels simulating a shingle or shake type structure, which panels may be used for roofing, exterior siding, interior paneling or any other equivalent exterior or interior buiding use. The present method of fabrication consists of providing the face layer of sheet material in continuous ribbon form, coating, painting, and baking the sheet material, subjecting the sheet material to a die stage to create any desired surface pattern, injecting the plastic material onto the sheet material in a fluid state while moving the face layer linearly in a horizontal plane, heating the face layer so that the plastic material forms a hard crust on at least one side thereof, permitting the plastic material to harden and grow on the face layer to form a substantially rigid base layer which is bonded to the face layer, and cutting the strip of finished building material into desired lengths. Finally, novel apparatus is provided for most of these fabrication steps.

It is therefore an object of the present invention to provide a novel building material.

It is a further object of the present invention to provide a thermally insulated, fire-resistant building material made from highly available synthetic materials.

It is a still further object of the present invention to provide a building material which provides a high degree of thermal insulation and soundproofing.

It is another object of the present invention to provide a building material using synthetic materials which may accurately simulate the surface grain of naturally-occurring building materials.

It is still another object of the present invention to provide a lightweight building material which is initially inexpensive, easily handled and installed, and easily repaired when required.

Another object of the present invention is the provision of a method for fabricating synthetic building materials.

Still another object of the present invention is the provision of means for manufacturing a thermally insulated, fire-resistant, synthetic building material.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

foam which is self-extinguishing. In other words, although the foam will burn if subjected to flame action, removal of the flame will cause immediate extinguishing of the foam. In addition, such a compound produces no toxic fumes and is an acceptable building material.

Figure 2:
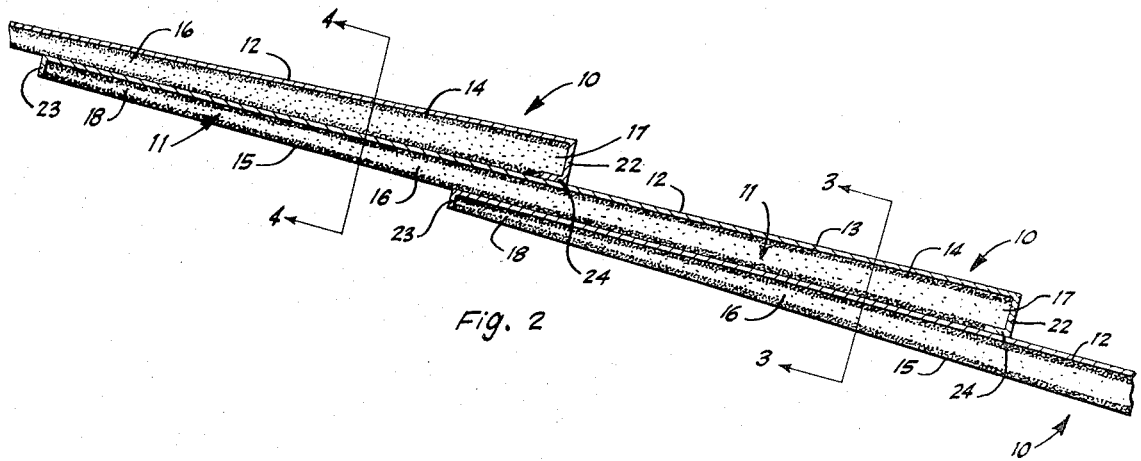
FIG. 2 is an enlarged, sectional view taken along the line 2—2 in FIG. 1.

As seen most clearly in FIG. 2, building panel 10 has a generally uniform, wedge-like cross-section including a relatively thick end 17 and a relatively thin end 18, thick end 17 adapted to overlap the thin end 18 of an adjacent panel 10, in an arrangement generally similar to the overlapping of shingles in a conventional shingle roof structure. However, it should be noted that the same principles of construction and laying or installation of panels can be applied where the invention is embodied in siding panels laid in horizontal courses, or in vertical wall finish panels installed with their longitudinal areas and side margins running vertically.

Face layer 12 is preferably of formed sheet material which is relatively thin compared to the thickness of base layer 11. According to a preferred embodiment of the present invention, face layer 12 is made from an aluminum foil material which is relatively inexpensive, yet provides a highly resistant surface under the effects of weathering, abrasion by dust storms, rain and hail, and corrosion. Also, as will appear more fully hereinafter, the use of aluminum foil simplifies the method of fabrication of panels 10.

Alternatively, face layer 12 may be made of a thin, synthetic, resin plastic sheet, possibly impregnated with fiber glass, to make a panel suitable for exterior walls of mobile homes or the like. In addition, face layer 12 may be of dry wall construction such as used for interior paneling. In any event, face layer 12 serves several functions. In the first instance, face layer 12 may be formed to provide a mold for receipt of the plastic material which forms base layers 11. Thereafter, face layer 12 remains permanently attached to base layer 11 to provide an exterior, exposed face. Secondly, face layer 12 may have a pattern therein simulating the surface grain of a naturally-occurring building material, such as heavy shake shingle, which may be painted for long life and natural appearance, in addition to providing heat reflectivity and a fire barrier.

Figure 1:
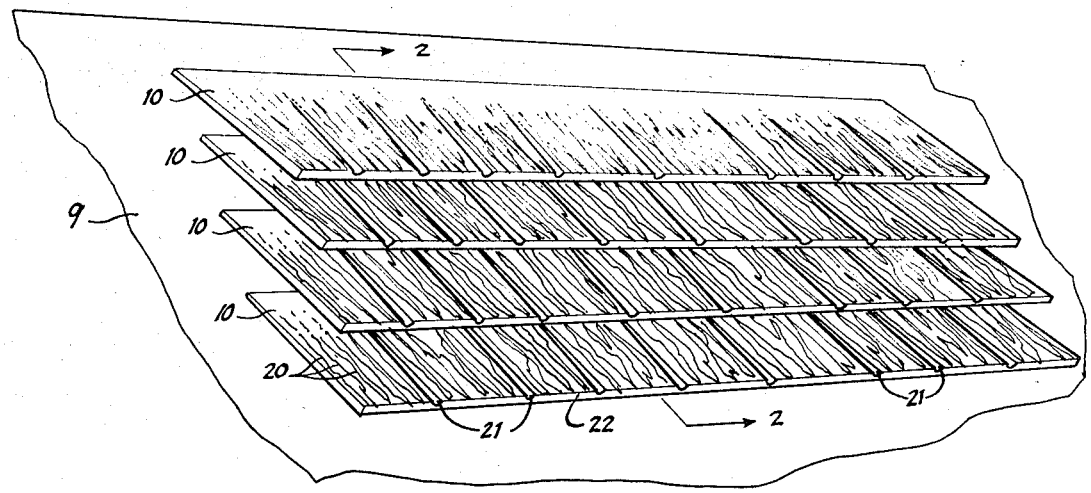
FIG. 1 is a perspective view of a portion of a roof structure showing several panels positioned thereon, such panels being constructed in accordance with the teachings of the present invention.
Figure 4:
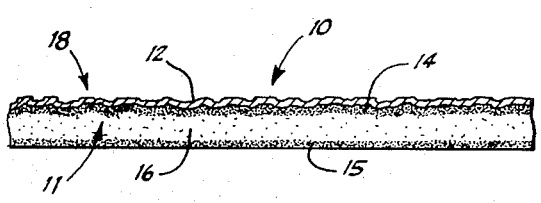
Figure 3:
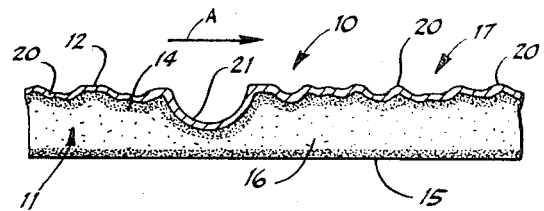
FIG. 3 is an enlarged sectional view taken along the line 3—3 in FIG. 2 and showing the upper building panel only.

As shown most clearly in FIGS. 1, 3 and 4, the pattern in face layer 12 may comprise a series of closed spaced, generally parallel, transverse, grain ridges 20 generally simulating, for example, the irregular grain surface of a split shake or the more regular grain surface of a shingle or of a siding board, as the case may be, as well as a plurality of spaced, parallel, transverse grooves or depressions 21 simulating cracks between adjacent shingles of a course of shingles. As will be explained more fully hereinafter, grain ridges 20 and grooves 21 have a maximum depth at thick end 17 of each of panels 10, this maximum depth extending for up to one-half of the width of each of panels 10 (see FIG. 3). At thin end 18, grain ridges 20 and grooves 21 are smoothed or ironed out, as seen in FIG. 4, to provide thin end 18 with an essentially flat upper surface to conform to the flat underface of the overlapping panel 10, as seen in FIG. 2. The manner of forming such a structure will be explained more fully hereinafter.

The composite panel structure 10 formed by base layer 11 and face layer 12 constitutes a structural member of great utility, having many advantages. In addition to face layer 12 having a pattern therein providing any desired appearance, the exterior face thereof may be coated with a fire-retardant paint in natural colors and baked on for long life and colorfastness. Where face layer 12 is made from aluminum, the thermal insulation property of base layer 11 is enhanced by the high degree of reflectivity offered by face layer 12.

Both edges 22 and 23 on opposite sides of each of panels 10, adjacent thick and thin ends 17 and 18, respectively, are bent downwardly at an angle of 90° relative to the remainder of face layer 12. In the first instance, such edges form the sides of the mold in the foam injection stage, as will appear more fully hereinafter. In addition, leading edge 22 is visible in the installation in a building, as seen in FIG. 1, and so leading edge 17 provides color and appearance continuity from the top of one panel to the top of the underlying panel. Finally, a small lip 24 at the outermost end of edge 22 of face layer 12 is again bent inwardly at an angle of 90° so as to be parallel to the outer surface of face layer 12. By bonding lip 24 of face layer 12 to the underlying panel 10, base layer 11 is completely enclosed and fraying or curling of leading edge 22 is essentially prohibited. In addition, lip 24 prevents erosion from wind or other forces on edge 22 of the aluminum, as well as insuring a continuous fire barrier.

Almost complete fireproof construction is provided with the protective coating of metal foil or other fire-resistant material of face layer 12 which protects base layer 11 from direct contact of flaming embers, etc., in the event of a serious conflagration surrounding the building that is protected by paneling 10. Another important characteristic of the material of base layer 11 is its resistance to softening and loss of shape under the temperatures transmitted to it through protective face layer 12, even in the case of a general conflagration of neighboring buildings, dry brush, etc.

Figure 5:
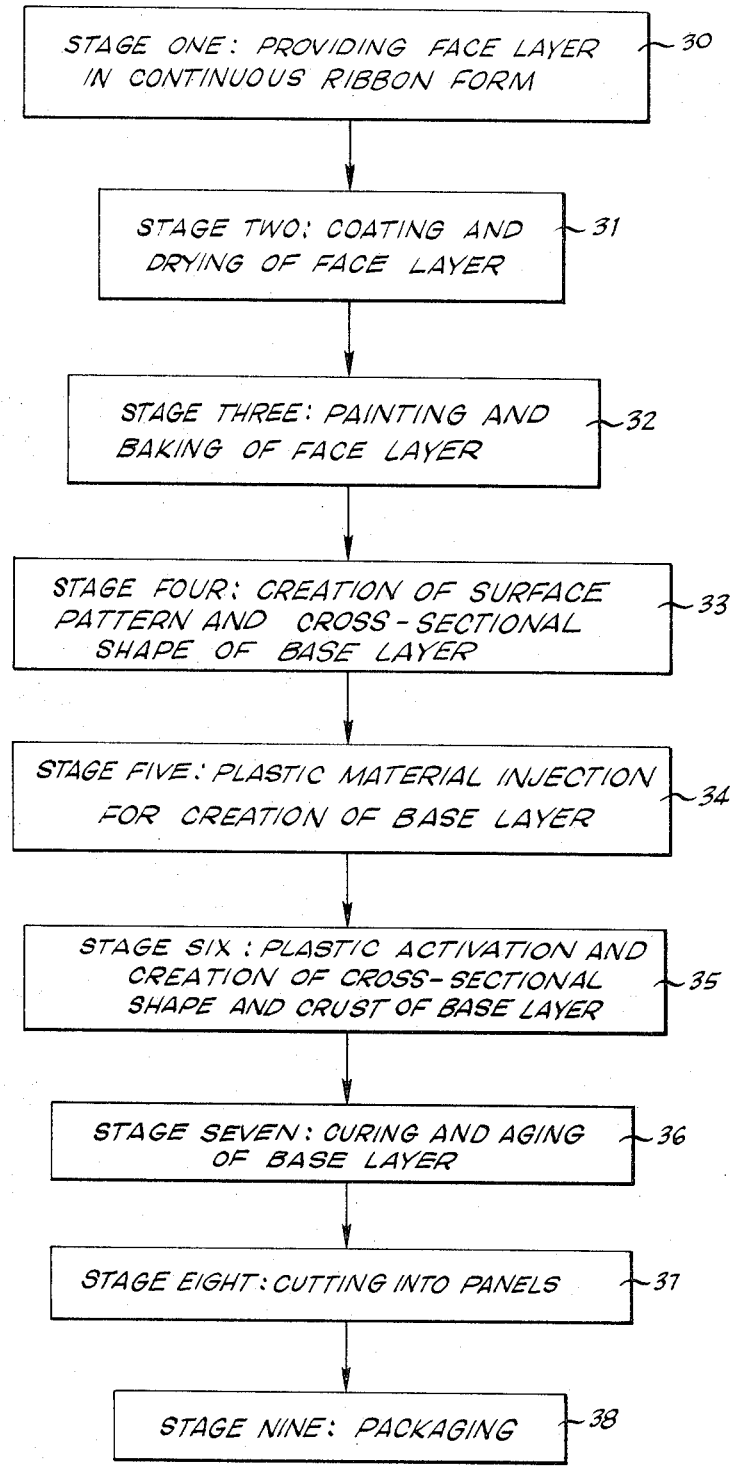

Referring now to FIG. 5, the preferred method of fabrication of panels 10 is suitable not only for panels having the appearance shown in FIGS 1-4, but a wide variety of panel structures for roofing, exterior siding, interior paneling, and other equivalent exterior and interior building uses. Stage one, generally designated 30, of the preferred method of fabrication consists of providing face layer 12 in continuous ribbon form. This is preferred and would be most desirable where face layer 12 is made from aluminum foil since the process is most susceptible of being continuous. However, where hardened synthetic resin plastic materials or other materials are utilized for face layer 12, it may not be possible to provide such materials in continuous ribbon form. In any event, face layer 12 should be fed continuously into and through the following stages.

Stage two, generally designated 31, includes coating and drying face layer 12 with suitable preserving materials and subsequently drying face layer 12. More specifically, where aluminum is used as the material for face layer 12, such aluminum, in stage two, would be entirely coated on both sides thereof with a suitable material for preserving the aluminum and preventing corrosion. A suitable coating could be aluminum oxide. After being coated, the aluminum would be subjected to an elevated temperature for rapid drying of the coating.

Figure 8:
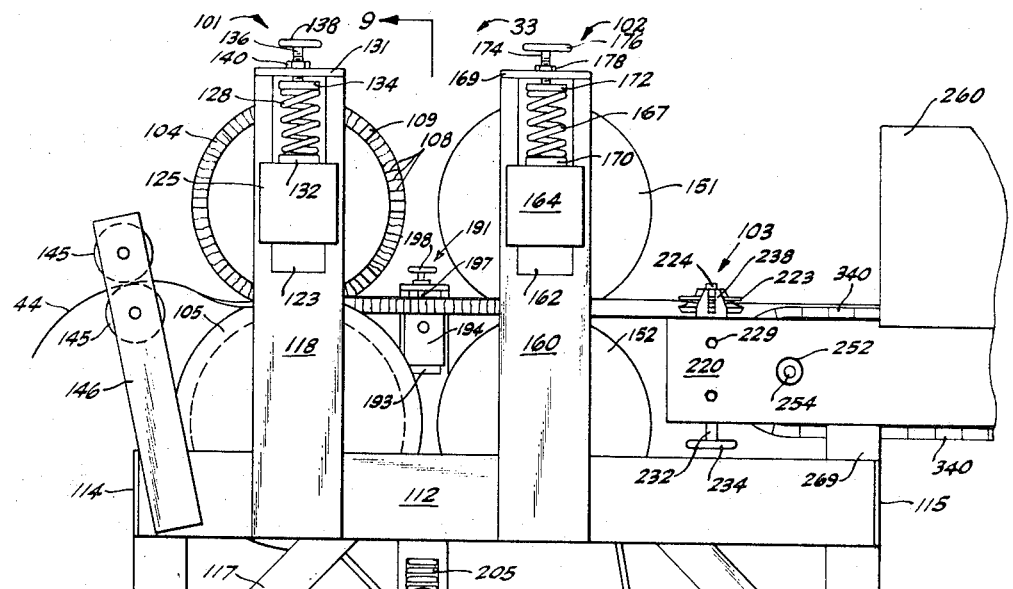
Figure 9:
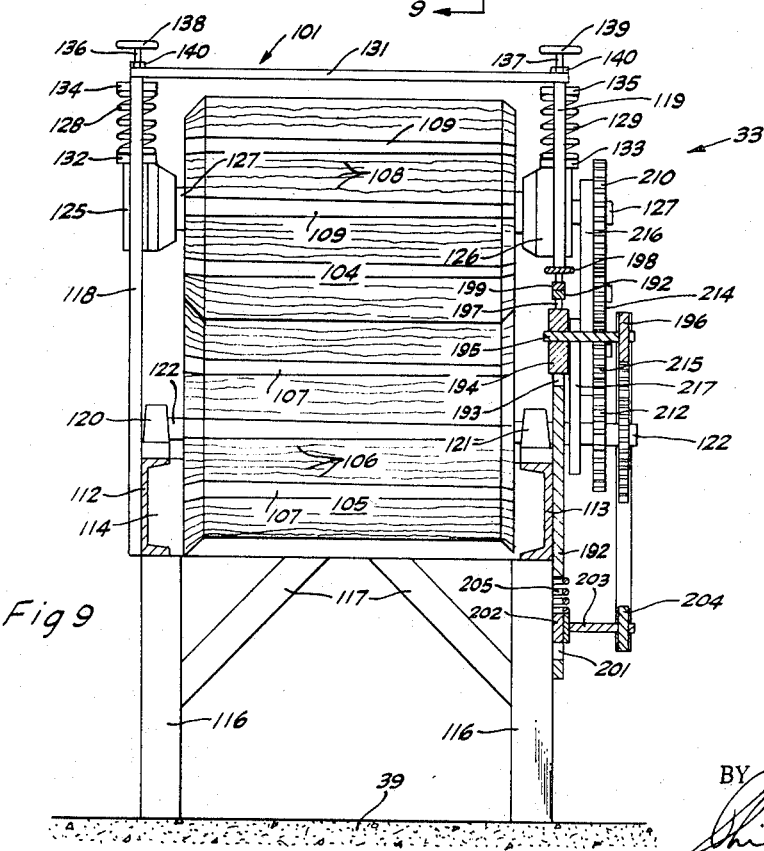
Figure 15:
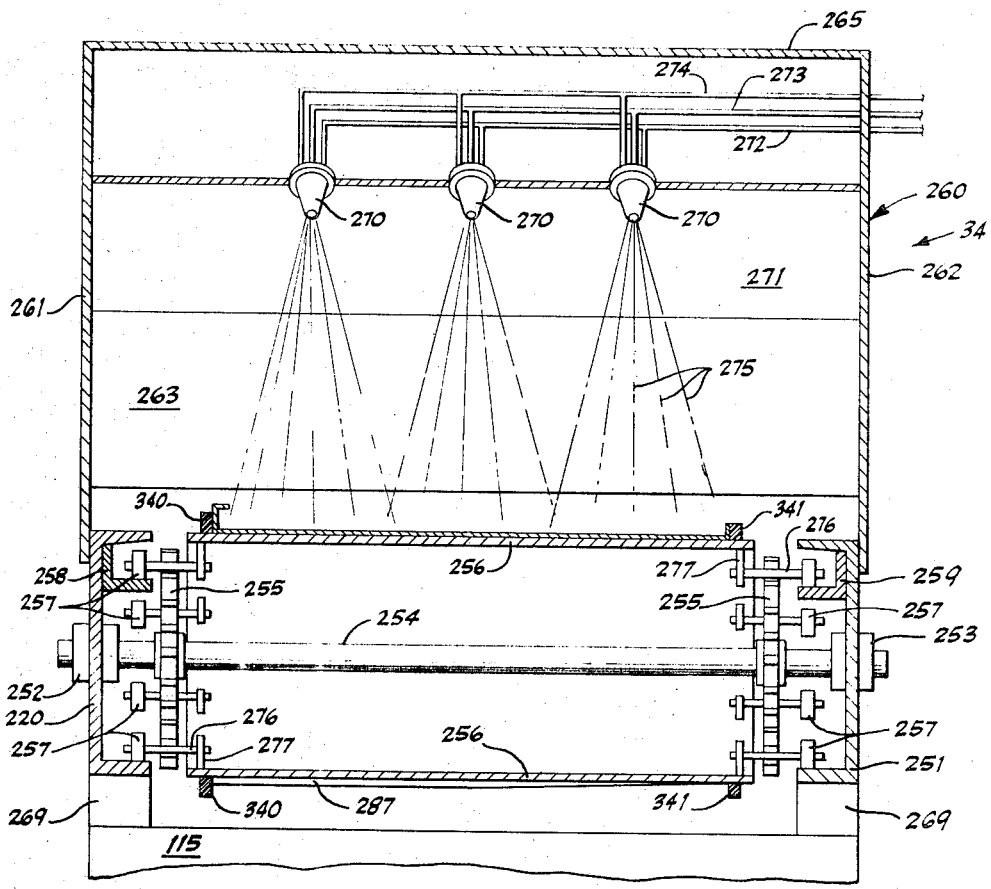
Figure 12:
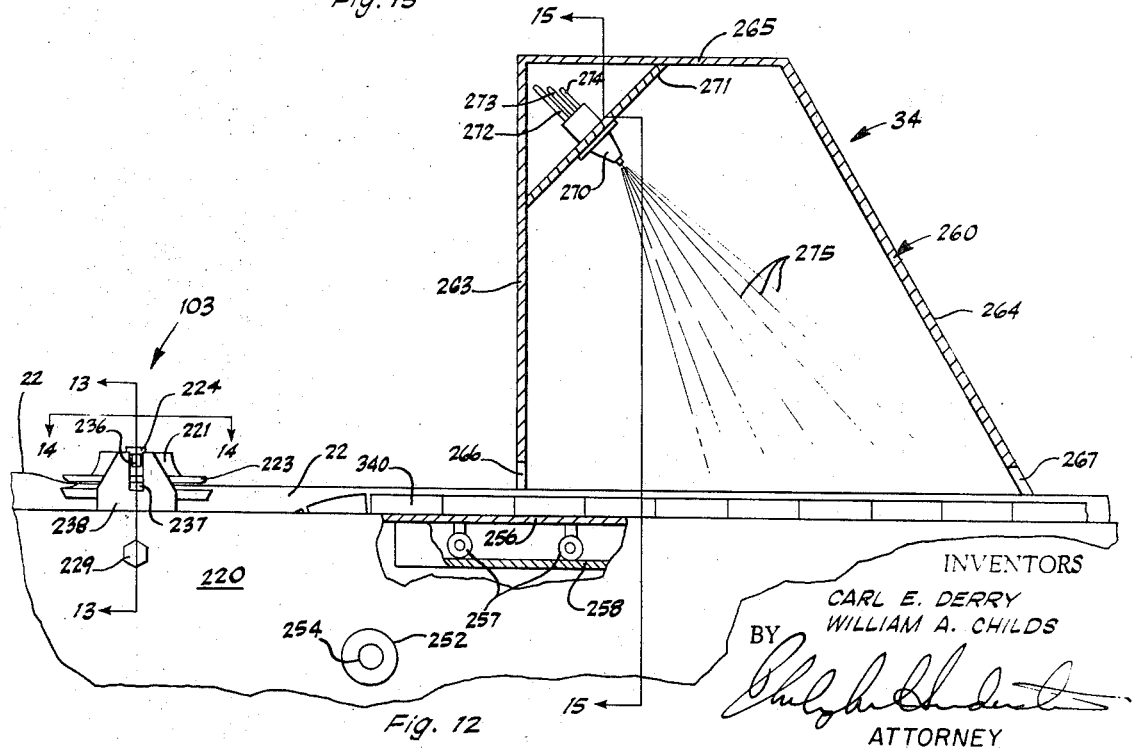
Figure 16:
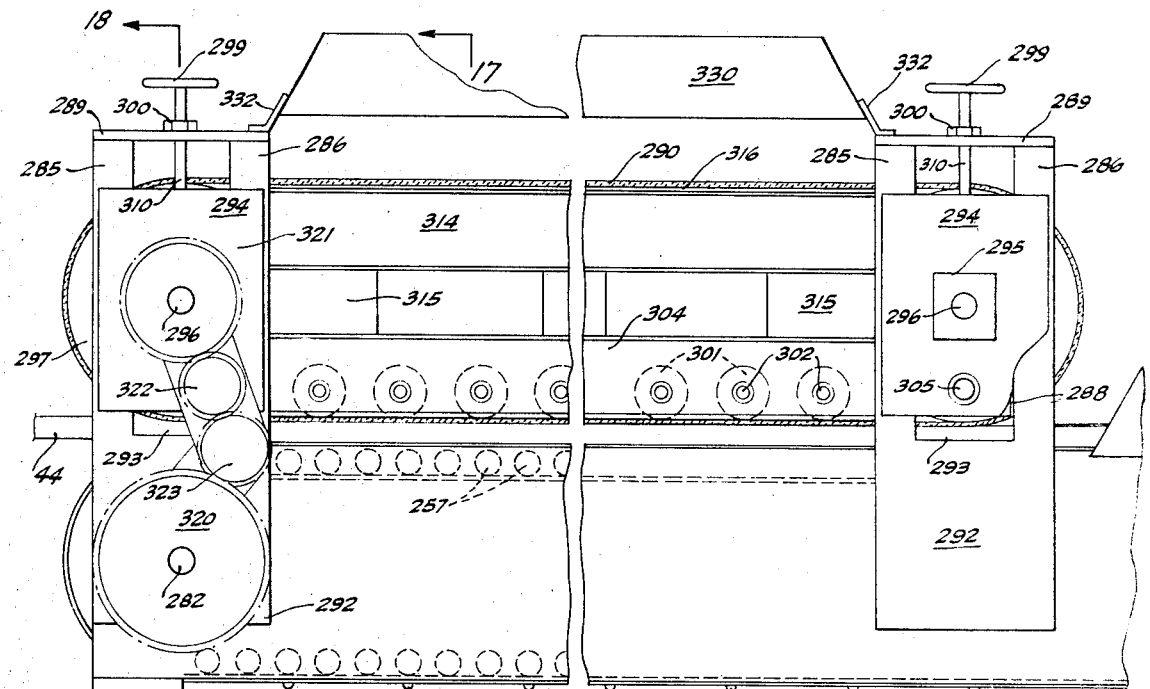
Figure 17:
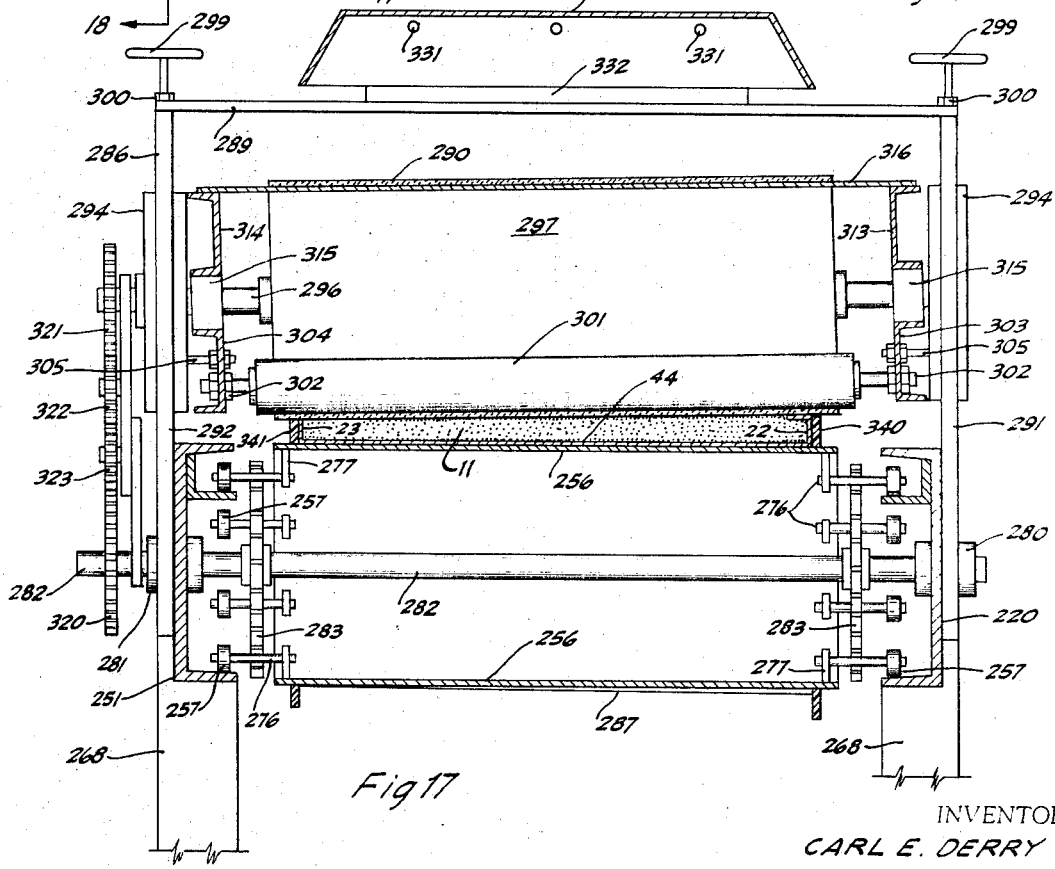

Stage three, generally designated 32, includes coating the outer side of face layer 12 with a suitable fire-resistant, weather-resistant, exterior paint and baking FIG. 4 is an enlarged sectional view of the building panel of FIG. 3 taken along the line 4—4 in FIG. 2;

FIG. 5 is a flow diagram of a preferred method of fabricating the building panels of FIGS. 1-4;

FIG. 6 is a front elevation view of a preferred embodiment of Stages 1, 2, and 3 of the method of FIG. 5, with the front panel of the coating, drying, painting, and baking oven removed;

FIG. 7 is a sectional view taken along the line 7—7 in FIG. 6;

FIG. 8 is a front elevation view of a preferred embodiment of Stage 4 of the method of FIG. 5 for the creation of a desired surface pattern and cross-sectional shape for the face layer of the panels shown in FIGS. 1-4;

FIG. 9 is a sectional view taken along the line 9—9 in FIG. 8;

FIG. 10 is a rear elevation view of the apparatus of FIG. 8;

FIG. 11 is a sectional view taken along the line 11—11 in FIG. 10;

FIG. 12 is an enlarged, front elevation view of a preferred embodiment of a portion of stage 4 as well as stage 5 of the method of FIG. 5, with the front panel of the plastic injection housing removed;

FIG. 13 is an enlarged cross-sectional view taken along the line 13—13 in FIG. 12;

FIG. 14 is a partial, top plan view taken in the direction of arrows 14—14 in FIG. 12;

FIG. 15 is a sectional view taken along the line 15—15 in FIG. 12;

FIG. 16 is a rear elevation view of a preferred embodiment of stage 6 in the method of FIG. 5;

FIG. 17 is a sectional view taken along the line 17—17 in FIG. 16; and

FIG. 18 is a partial, enlarged, sectional view taken along the line 18—18 in FIG. 16.

DESCRIPTION OF THE PREFERRED EMBODIMENT

The present building material is intended for use as roofing material, exterior siding, interior paneling, or any other equivalent exterior or interior use. The present building material is in the form of a panel structure made from synthetic materials, but which may be fabricated so that the finished panel simulates the surface grain and appearance of naturally-occurring building materials. For the purpose of providing a complete disclosure of a preferred embodiment of the present invention, there will be described, hereinafter, the construction of building panels simulating the rustic appearance of heavy shake shingles, since such shingles are applicable to any home design, are most preferred by home owners and builders, and may be used for roofing, exterior siding, or interior paneling. However, it will be apparent to those skilled in the art, that the present invention, including the building materials themselves, the method of fabrication, and the apparatus for fabrication, are equally applicable to a multiplicity of different types of building structures.

Referring now to the drawings and, more particularly, to FIGS. 1-4 thereof, the present building material takes the form of a building panel structure, generally designated 10. In the embodiment of FIGS. 1-4, each of panels 10 simulates multiple shingles of a shingle or shake type roof. Each of panels 10 comprises, in general, a rigid, lightweight base layer 11 and a relatively hard, weather-resistant face layer 12 bonded to at least one surface 13 of base layer 11. Base layer 11 consists of a synthetic resin plastic material such as polyurethane, polyether, polyester or polystyrene, of foamed, cellular structure embodying a myriad of minute air cells, entirely surrounded by extremely thin cell wall films, in a proportion of air cell volume to solid film volume such that the structure of base layer 11 is extremely lightweight, yet of ample rigidity to resist the tendency to warp under the strains imposed by temperature changes, impact of wind velocity, stresses developed in the frame structure of the building, etc. The air cells are closed so that base layer 11 is not rigid but is also completely impervious to the penetration of moisture so as to provide a completely dry inward surface in the covering provided by the overlap panels.

Where panels 10 are used on a roof 9, it is necessary to create an even more rigid structure within panel 10 than that usually obtainable with synthetic resin plastic materials so that panels 10 may withstand the weight of individuals who may walk on the roof. Accordingly, and in accordance with the present invention, base layer 11 includes a hard crust 14 and 15 on opposite faces thereof, crusts 14 and 15 being approximately one-sixteenth to one-eighteenth inch thick and providing the higher degree of rigidity and strength required. As will be explained more fully hereinafter with respect to the preferred method of fabrication of panels 10, crust 14 is created by allowing the plastic material to be injected onto face layer 12 in a fluid state while face layer 12 is held at an elevated temperature. This causes the plastic material to set very rapidly, before the complete cellular structure may be formed. The remainder of the cellular base layer 11 is then permitted to grow normally until it contacts another heated surface where crust 15 is formed. The result is a sandwich panel effect including a central cellular structure 16 having hard crusts 14 and 15 on opposite sides thereof.

Although any of the beforementioned synthetic plastic materials may be used for base layer 11, it is preferred to use a closed cell, polyurethane foam which has proven to be one of the best thermal insulators ever developed. Such a material has been used for many years and has been shown to have a long life span. In addition, polyurethane closed cell foam has been scientifically proven to be one of the best materials to deaden sound. Statistics show that one inch of closed cell, polyurethane foam is equal to approximately three feet of solid brick as a sound barrier. This is due to the well known fact that sound waves will travel through a solid quite readily whereas polyurethane closed cell foam has millions of minute dead air spaces in its structure which act as a cushion for the sound waves and deaden them before they penetrate. Another advantage of a closed cell foam such as polyurethane foam is that it is extremely light and will stand much more abuse without damage and would be much less apt to collapse from the shock of an earthquake.

It is also preferred to employ a plastic material such as polyurethane foam which is fire-resistant. There are many types of self-extinguishing chemicals that could be incorporated in the formula but most retardant chemicals, upon burning, produce a toxic gas and when inhaled will cause drowsiness, dizziness, and even death. For best results, and in accordance with the present invention, a polyurethane resin is combined with an isocyanate compound which results in a plastic face layer 12 and such paint for rapid drying thereof. Accordingly, upon leaving stage three, the continuous ribbon of aluminum foil is completely coated, painted, and dryed and ready for subsequent processing.

Stage four, generally designated 33, of the preferred method of fabrication of building panels 10, consists of the creation of the desired surface pattern and cross-sectional shape for face layer 12. More specifically, the aluminum foil leaving stage three in continuous ribbon form is entirely flat, with a smooth upper and lower surface. Upon exiting from stage four, the aluminum will have acquired the cross-sectional shape shown in FIG. 2 and the surface pattern shown in FIGS. 3 and 4. Apparatus for achieving this result will be described more fully hereinafter. For present purposes, suffice it to say that the aluminum leaving stage four has any desired surface pattern and cross-sectional shape. In accordance with the embodiment shown in FIGS. 1-4, the aluminum will be inverted relative to the showings in FIGS. 2-4 so that marginal edges 22 and 23 extend upwardly. In addition, the aluminum will be traveling in a direction transverse to grain ridges 20 and grooves 21, as indicated by arrow A in FIG. 3.

Stage five, generally designated 34, includes the injection of the plastic material in a fluid state onto face layer 12 while face layer 12 continues to move linearly in a horizontal plane. As will be explained more fully hereinafter, stage five may consist of a simple housing which entirely surrounds the area above the moving face layer 12 and which supports a plurality of spray nozzles which spray the plastic material onto face layer 12 as it moves therethrough. The materials used to form base layer 11 will have a fire-retardant compound included therewith, as explained previously, as well as a bonding agent so that the plastic material grows on and is bonded to face layer 12. As will be explained more fully hereinafter, when face layer 12 enters stage five, it is quite hot as a result of the drying and baking action of stages two and three. Accordingly, when the plastic material in a fluid state makes contact with face layer 12, a thin crust of the plastic material is activated and hardened very rapidly before the complete cellular structure may be formed. However, except for this thin crust, indicated at 14 in FIGS. 2-4, adjacent face layer 12, the plastic material beings to grow normally.

Face layer 12 having the foam thereon continues to move linearly in a horizontal plane into stage six where the plastic material is activated while the cross-sectional shape and crust 15 is simultaneously created. As will be explained more fully hereinafter, within stage six, the vertical growth of base layer 11 is limited to the area encompassed by the outer end of edge 23 and lip 24 by a surface positioned in contact with such elements. By applying heat to such surface, two desirable effects are achieved. In the first instance, the heat accelerates the rise time and activation of the plastic material which therefore ages at a rate much faster than usual. In addition, when the growing plastic material forming base layer 11 contacts this heated surface, a thin crust at the upper end thereof sets very rapidly before the complete cellular structure is formed. Accordingly, a crust 15, identical to crust 14, is formed on the other side of base layer 11. The result is a sandwich panel effect including a central cellular structure 16 having hard crusts 14 and 15 on opposite sides thereof.

At the end of stage six, base layer 11 is fully activated and grown to its capacity so that building panel 10 has the completed appearance shown in FIGS. 2-4. The composite structure is then subjected to stage seven, generally designated 36, where base layer 11 continues to cure and undergoes a high degree of aging. Stage 7 may, most simply, be an elongated oven, open at opposite ends thereof, through which the continuous ribbon of base layer 11 and face layer 12 passes. Accordingly, upon exiting from stage seven, the building panel is completed and ready for use. Accordingly, the structure is subjected to an eighth stage, generally designated 37, where the continuous length of face layer 12 and base layer 11 is cut into convenient lengths, such as 4 feet panels 10. Thereafter, panels 10 may be passed onto a final stage nine, generally designated 38, for packaging of a predetermined number of panels 10 into a unit suitable for shipment.

Referring to FIGS. 6 and 7, the first stage 30 of the method of FIG. 5 may comprise a pair of fixed supports 40 and 41 which rotatably support opposite ends of a shaft 42 on which is mounted a continuous roll 43 of material 44 of which face layer 12 may be constructed. According to the embodiment discussed previously, roll 43 of material 44 consists of aluminum foil having any desired width. For example, in the manufacture of roofing, exterior siding, or interior paneling, roll 43 may conveniently have a width of 24 inches.

Material 44 from roll 43 is conducted into a housing 45 which may contain coating and drying stage 31 as well as painting and baking stage 32. More specifically, housing 45 is of conventional rectangular configuration, including side walls 46 and 47, end walls 48 and 49 and a top wall 50. Walls 45-49, as well as supports 40 and 41, may be positioned on a suitable base 39 made of concrete or the like. End wall 48 has a lateral slot 51 extending entirely thereacross, adjacent the bottom thereof, for entry of material 44 into housing 45. Similarly, end wall 49 has a lateral slot 52 extending entirely thereacross, adjacent the bottom thereof, for exit of material 44 out of housing 45.

Housing 45 is divided by vertical walls 53-55 into four chambers 56-59. Each of walls 53-55 may be constructed by extending an upper support channel 60 and a lower support channel 61 between side walls 46 and 47 and by connecting horizontally spaced, vertical partitions 62 and 63 to opposite sides of channels 60 and 61. Each of upper channels 60 of walls 53-55 are spaced by a short distance from top wall 50 of housing 45 and the tops of partitions 62 and 63 do not extend thereabove, for reasons which will become more apparent hereinafter. Lower channels 61 of walls 53 and 55 may be positioned adjacent the bottom of housing 45 but channel 61 of wall 54 would be spaced from the bottom of housing 45 by a small amount, also as will appear more fully hereinafter.

A series of identical, horizontally oriented rollers 65, connected via bearings 66 to side walls 46 and 47, conduct material 44 through housing 45. More specifically, a first roller 65a is positioned adjacent slot 51 in end wall 48 and conducts material 44 to a second roller 65b positioned to feed material 44 upwardly through the center of chamber 56. A pair of rollers 65c and 65d located at the upper ends of chambers 56 and 57, respectively, conduct material 44 from chamber 56, over wall 53, and direct it downwardly through chamber 57. A similar pair of rollers 65e and 65f located at the lower ends of chambers 57 and 58, respectively, conduct material 44 from chamber 57, under wall 54, and direct it upwardly through chamber 58. A pair of rollers 65g and 65h located at the upper ends of chambers 58 and 59, respectively, conduct material 44 from chamber 58, over wall 55, and direct it downwardly through the center of chamber 59. Finally, a roller 65i located adjacent the bottom of chamber 59 conducts material 44 between a pair of drive rollers 67 and 68 which conduct material 44 through slot 52 in end wall 49 out of housing 45.

One or both of rollers 67 and 68 may be driven by a motor 69 to control the speed of movement of material 44 through housing 45. Since material 44 will be, according to the preferred embodiment, thin, aluminum foil, it is desirable to rotate one or more of rollers 65 to assist in the movement thereof. This may be achieved most simply by positioning a shaft 70 within housing 45, adjacent top wall 50 and end wall 49, and by mounting a pair of gears 71 thereon. By positioning a similar gear 72 on the shaft supporting drive roller 67 and by connecting gear 72 to one of gears 71 via a chain 73, shaft 70 may be rotated with drive rollers 67 and 68. Then, by mounting a gear 74 on the shafts supporting rollers 65c, 65d, 65g, and 65h and by connecting gears 74 via a chain 75 to the other of gears 71 mounted on shaft 70, each of rollers 65c, 65d, 65g, and 65h may be driven to assist in the conveying of material 44. As shown in FIG. 6, chain 75 may be mounted internally of housing 45 whereupon chain 75 would travel above and below channels 60 of walls 53–55. In such a case, the upper ends of partitions 62 and 63 would be slightly cut out at the sides thereof for passage of the lower half of chain 75. Alternatively, gears 74 and chain 75 may be positioned exterior of side walls 46 and 47.

With the apparatus just described, material 44 is conveyed successively through chambers 56, 57, 58, and 59. Chamber 56 is provided with a floor 76 adjacent the bottom thereof which may be supported by channels 77 connected between side walls 46 and 47. Floor 76 has a lateral slot 78 therein extending thereacross for at least the width of material 44 for passage of material 44 therethrough. Beneath floor 76, on opposite sides of material 44, is a pair of identical spray heads 80 which are designed to direct liquid sprays 81 onto opposite sides of material 44. For this purpose, each of spray heads 80 has a pair of input lines 82 and 83, input line 82 conducting to spray head 80 a suitable material for preserving the aluminum and preventing corrosion thereof, input line 83 providing a source of air. Spray heads 80 are then operative to completely coat both sides of material 44 with a coating, such as aluminum oide. A fender-like structure 84 connected to walls 46–48 may be positioned above rollers 65a and 65b to prevent the liquid from coating and clogging the effectiveness thereof.

After being coated on opposite sides thereof, material 44 passes through slot 78 in floor 76 into chamber 56. Chambers 56 and 57 provide a space for the coating to be completely dried. Such drying is achieved by applying heat to material 44, such heat being applied in any conventional manner. For example, and as shown in FIGS. 6 and 7, a plurality of heating lamps 85 may be connected to sockets 86 connected to end wall 48, partitions 62 and 63 of wall 53, and partitions 62 of wall 54. Power for operating lamps 85 may be conducted to sockets 86 through the space between partitions 62 and 63 of walls 53–54. It will be obvious to those skilled in the art that the height of housing 45 will be chosen to provide adequate drying time for the coating on material 44. It should also be noted that floor 76 isolates spray heads 80 and 81 from the heat in chambers 56 and 57.

When material 44 reaches roller 65e, it is completely dry and ready for painting and baking stage 32. Painting and baking stage 32 is similar to coating and drying stage 31 and includes a single spray head 90 positioned to direct a spray 91 onto one side of material 44. Spray nozzle 90 includes two input lines 92 and 93, input line 92 supplying a suitable exterior, fire-resistant paint and input line 93 supplying air for operation and formation of spray 91. It will be noted that spray head 90 directs spray 91 onto the side of material 44 which is on the bottom when material 44 passes through slot 52 out of housing 45. A fender 89, which is similar in structure and purpose to fender 84, may be positioned above roller 65f to prevent coating thereof.

Spray head 90 is positioned at the lower end of chamber 58, beneath a floor 94 having a slot 95 therein, floor 94 having the same configuration and being supported in the same manner, by channels 77, as floor 76. Accordingly, after application of spray 91, material 44 passes through slot 95 in floor 94 into chamber 58. Chamber 58, as well as chamber 59, includes an additional series of lamps 85 connected to sockets 86 mounted along partition 63 of wall 54, paritions 62 and 63 of wall 55 and end wall 49 of housing 45. Accordingly, chambers 58 and 59 provide a space for drying and baking the exterior paint applied to the beforementioned one side of material 44. As a result, when material 44 passes between drive rollers 67 and 68 and out of housing 45 through slot 52 in end wall 49, the continuous ribbon of aluminum foil is completely coated, painted, and dryed and ready for subsequent processing in stages four through nine.

It will be apparent to those skilled in the art that the drive capability provided by motor 69, drive rollers 67 and 68 and rollers 65c, 65d, 65g, and 65h would not be great enough to pull material 44 from roll 43 since material 44 is quite thin and roll 43 is quite heavy. Accordingly, stage 30 includes a motor 96 for driving roll 43 of material 44. Motor 96 includes an input 97 which may be derived in any suitable fashion. It is most desirable to drive motor 96 independently of any other drives, depending upon the demand placed by motor 69. This may be achieved, most simply, by providing a predetermined amount of slack in the length of material 44 between roll 43 and slot 51 in end wall 48 of housing 45. The desired amount of slack may be sensed by mounting a solenoid switch 98 on a suitable support 99 adjacent one side of material 44, between roll 43 and slot 51, solenoid 98 having an activating arm 100 which extends across the top of material 44. The output of switch 98 would then be connected to input 97 of motor 96.

In operation, as rollers 67 and 68 pull material 44 from roll 43 into housing 45, the length of material 44 between roll 43 and slot 51 arises. When material 44 contacts arm 100 of switch 98, which contact would occur at a time prior to the length of material 44 between roll 43 and housing 45 becoming taut, an electrical impulse is directed to input 97 of motor 96 to drive roll 43 by a predetermined amount to increase the slack in material 44.

It may be desirable to provide an additional stage between stages 30 and 31 to preheat material 44 before material 44 enters coating and drying stage 31. The preheating of aluminum 44 to approximately 180° F would be effective in accelerating the aging of the undercoating added in chamber 56. Such preheating may be achieved by positioning a pair of heating lamps 85 on opposite sides of material 44, between arm 100 and slot 51 in housing 45. Lamps 85 would be positioned in suitable sockets 86, which sockets may be connected to support 99 and end wall 48 of housing 45.

Referring now to FIGS. 8–11, there is shown a preferred embodiment of stage four, generally designated 33, for the creation of the desired surface pattern and cross-sectional shape for face layer 12. As indicated previously, stage 33 is intended to receive the aluminum leaving slot 52 in housing 45, which is entirely flat, with smooth upper and lower surfaces, and to convert the cross-sectional shape of material 44 into that shown in FIG. 2 and the surface pattern into that shown in FIGS. 3 and 4. For this purpose, stage 33 includes first, second and third die stages 101, 102, amd 103. Die stage 101 includes a pair of upper, female and lower, male rollers 104 and 105. Roller 105 has a surface configuration of outwardly extending, generally parallel ridges 106 conforming to the spaces between ridges 20 on face layer 14, as well as intervening larger ridges 107 for creating grooves or depressions 21. Roller 104 includes a corresponding series of depressions 108 and grooves 109 corresponding and mating with ridges 106 and 107, respectively.

It should be noted that ridges 106 and 107 and depressions 108 and 109 extend for the entire width of rollers 104 and 105 so that material 44, as it passes line 9—9 in FIG. 8, has a uniform pattern from side to side. This is so in spite of the fact that material 44, as it leaves die stage 102, is not uniform, as shown in FIGS. 3 and 4. The reason for this is that rollers 104 and 105 of die stage 101 form the pattern shown in FIG. 3 by gathering material 44 in, ridges 106 and 107 actually tucking the material into depressions 108 and 109, rather than stretching the thin aluminum material. This being the case, it is necessary to gather the material in uniformly to prevent material 44 from curving laterally upon exiting from die stage 101. As will be discussed more fully hereinafter, after material 44 is completely and uniformly formed by die stage 101, die stages 102 and 103 selectively remove those portions of the pattern which are not desired.

As shown most clearly in FIG. 9, the opposite ends of rollers 104 and 105 are bent at an angle of 45° to start the formation of edges 22 and 23. If material 44 were bent completely to 90° in die stage 101, it would not be possible to create the pattern therein, which is necessary to prevent deformation of the edges thereof. Furthermore, by bending the side edges of material 44 by some angle greater than 0° but less than 90°, the remaining stages are somewhat simplified.

Rollers 104 and 105 of die stage 101 may be supported in any convenient manner to receive material 44 as it exits from housing 45. The entire stage 33 may be mounted on a table including side channels 112 and 113 which are connected at opposite ends thereof by plates 114 and 115. The table structure formed by channels 112 and 113 and plates 114 and 115 may be supported above base 39 by suitable legs 116 at the corners thereof. Additional supports 117 may be connected between legs 116 and channels 112 and 113 and plates 114 and 115 to provide strengthening.

Channels 112 and 113 may rigidly support first and second upright members 118 and 119 on the outer surfaces thereof, uprights 118 and 119 facing each other on opposite sides of the elongated support formed by channels 112 and 113. Channels 112 and 113 may support bearings 120 and 121 for supporting the opposite ends of a shaft 122 on which roller 105 is mounted. One end of shaft 122 terminates in bearing 120 whereas the other end extends through upright 119 for reasons which will appear more fully hereinafter. Uprights 118 and 119 have slots 123 and 124, respectively, adjacent the upper ends thereof, on either sides of roller 104, for supporting bearings 125 and 126 for movement in a vertical direction. Bearings 125 and 126 support the opposite ends of a shaft 127 on which roller 104 is mounted. Accordingly, roller 104 and shaft 127 are normally permitted to rotate with respect to bearings 125 and 126 which are also moveable vertically to permit vertical movement of roller 104.

Bearings 125 and 126 are permitted vertical movement so that the spacing between rollers 104 and 105 is not fixed and rigid. By permitting roller 104 to move slightly upwardly as material 44 passes between rollers 104 and 105, damage to material 44 is essentially prevented. Roller 104 is biased and urged downwardly by means of a pair of springs 128 and 129 connected to upright members 118 and 119, respectively. More specifically, a plate 131 is connected between the tops of upright members 118 and 119 to give lateral support thereto. Springs 128 and 129 are positioned in slots 123 and 124, respectively, in upright members 118 and 119, respectively, between bearings 125 and 126, respectively, and plate 131. Discs 123 and 133 may be positioned between springs 128 and 129, respectively, and bearings 125 and 126, respectively, to provide a suitable bearing surfaces for springs 128 and 129. A similar pair of discs 134 and 135 are positioned above springs 128 and 129 and may be connected to first ends of threaded shafts 136 and 137, respectively. Threaded shafts 136 and 137 extend through threaded holes in plate 131 and have hand wheels 138 and 139, respectively, connected to the opposite ends thereof. Accordingly, by rotating hand wheels 138 and 139, plates 134 and 135, respectively, may be moved vertically to adjust the tension which springs 128 and 129 place on bearings 125 and 126, respectively. Once the desired position of plates 134 and 135 is selected, shafts 136 and 137 may be locked in position by use of lock nuts 140 positioned thereon.

To elevate material 44 from where it leaves housing 45 to a suitable height for entry into die stage 101, stage 33 includes a pair of feed rollers 145 connected between first ends of a pair of vertical supports 146, the other ends of which are connected to channels 112 and 113.

Upon leaving die stage 101, material 44 has a uniform pattern from one side to the other and edges 22 and 23 are bent at an angle of 45°. Material 44 then enters stage 102 where two events occur simultaneously. Die stage 102 removes a portion of the pattern added by die stage 101 as well as folding edges 22 and 23 to an angle of 90° relative to the remainder of material 44. More specifically, and as discussed previously with respect to FIGS. 1–4, thick end 17 of each of panels 10 has the complete depth of surface pattern, this maximum depth extending for approximately one-half of the total width of panels 10. Starting approximately in the middle of panels 10, the surface pattern is gradually eliminated, face layer 12 being essentially flat at or near edge 23.

This is achieved by providing die stage 102 with a pair of upper, female and lower, male rollers 151 and 152 which have the same width as rollers 104 and 105 except for the tapered ends of the latter. As shown, roller 152 contains a series of ridges 153 and 154 which correspond exactly to ridges 106 and 107 on roller 105. The only difference is that ridges 153 and 154 extend at a maximum height for only a portion of the width of roller 152 and then are gradually tapered out. Similarly, roller 151 contains a series of depressions and grooves 155 and 156 which correspond exactly to grooves 108 and 109 on roller 104, grooves 155 and 156 extending at maximum depth for only a portion of the width of roller 151 and then gradually tapering out. The result is that at one side of material 44, the grooves and depressions formed by die stage 101 are unaltered whereas at the other side of material 44, they are gradually ironed out, as shown in FIG. 4.

With this exception, the remainder of die stage 102 is identical to die stage 101 and includes a pair of bearings 157 and 158 mounted on channels 112 and 113, respectively, for supporting the opposite ends of a shaft 159 on which roller 152 is mounted. A pair of upright members 160 and 161 are connected to channels 112 and 113, respectively, for supporting roller 151. More specifically, uprights 160 and 161 include slots 162 and 163, respectively, for supporting bearings 164 and 165, respectively, in the same manner that bearings 125 and 126 are supported in slots 123 and 124, respectively, in uprights 118 and 119, respectively. Bearings 164 and 165 support the opposite ends of a shaft 166 on which roller 151 is mounted. Accordingly, roller 151 is permitted slight vertical movement, but is urged downwardly by springs 167 and 168 which function in the identical manner as springs 128 and 129. Therefore, die stage 102 includes a plate 169, discs 170–173, threaded shafts 174 and 175, hand wheels 176 and 177 and lock nuts 178 which are identical in shape and function to corresponding elements 131–140, respectively, of stage 101.

Whereas die stage 101 bent edges 22 and 23 upwardly at an angle of 45°, die stage 102 completes the bending of edges 22 and 23 to a full 90° and also completely irons out the pattern on edges 22 and 23. This may be achieved most simply by positioning a pair of rollers 180 and 181 on opposite sides of rollers 151 and 152 so as to press edges 22 and 23 against the flat sides of rollers 151 and 152. Rollers 180 and 181 may be supported by brackets 182 and 183, respectively, connected to upright members 160 and 161, respectively.

It will be appreciated by those skilled in the art that since rollers 151 and 152 have patterns thereon which are exactly synchronized with the pattern on rollers 104 and 105, means must be provided for driving all of such rollers simultaneously and in complete synchronism. Such a mechanism is shown most clearly in FIG. 10 and includes a motor 185 for simultaneously driving each of rollers 104, 105, 151, and 152. More specifically, the shaft 186 of motor 185 supports a gear 187 which drives a chain 188 in the direction of arrow B. Chain 188 contacts and drives a second pair of gears 189 and 190 connected to shafts 122 and 159, respectively. Since shafts 122 and 159 are connected to rollers 105 and 152, respectively, rollers 105 and 152 are driven at the same speed and in synchronism.

To insure that the pattern on roller 152 contacts material 44 at the same location as the pattern on roller 105 contacts such material, a timing mechanism, generally designated 191, is included to adjust the length of chain 188 between gears 189 and 190. Mechanism 191 includes a vertical support 192 having a slot 193 therein which supports for vertical movement a bearing 194. Bearing 194 supports a shaft 195 on which is mounted a gear 196 adapted to engage chain 188 between gears 189 and 190. Bearing 194 is vertically moveable under the control of a threaded shaft 197, one end of which is connected to bearing 194, the other end of which is connected to a hand wheel 198, and the body of which extends through a threaded opening at the top of vertical support 192. Accordingly, by rotating hand wheel 198, threaded shaft 197 may be raised or lowered, moving bearing 194 in slot 193 and simultaneously moving shaft 195 and gear 196. Since gear 196 contacts chain 188 between gears 189 and 190, the effect is to shorten or lengthen the length of this section of chain to adjust the timing of roller 152 relative to 105. When rollers 105 and 152 are exactly in synchronism, the vertical position of bearing 194 is set by tightening a nut 199 on shaft 198 into contact with the upper end of vertical support 192.

Since timing mechanism 191 is capable of adjusting the length of chain 188 between gears 189 and 190, provision must be made for taking up the slack in chain 188. This may be achieved, most simply, by providing vertical support 192 with an additional slot 201 in which is mounted a moveable bearing 202. Bearing 202 supports for rotation a shaft 203 which supports a gear 204, gear 204 adapted to contact a portion of chain 188 between gear 189 and gear 187. By positioning a spring 205 in slot 201 so as to urge bearing 202 and gear 204 outwardly and downwardly, gear 204 will take up any slack created in chain 188 by movement of timing mechanism 191.

To drive rollers 104 and 151 with rollers 105 and 152, respectively, gears 210 and 211 may be mounted on shafts 127 and 166, respectively, gears 210 and 211 being driven directly by a pair of gears 212 and 213, respectively, mounted on shafts 122 and 159, respectively, by means of a pair of idler gears 214 and 215. To accomodate for the vertical movement of gears 210 and 211 with rollers 104 and 105, each of idler gears 215 may be connected to first ends of arms 216 and 217, the other end of arm 216 being connected either to shaft 127 or to shaft 166 and the other end of arm 217 being connected either to shaft 122 or to shaft 159. Idler gears 214 are then connected to arms 216 at points intermediate the opposite ends thereof. With such a connection, the vertical movement of gears 210 and 211 results in the rotation of arms 216 and 217 which permit continuous contact between idler gears 214 and 215 and gears 189, 190, 210, and 211.

Upon leaving die stage 102, material 44 has the shape shown in FIGS. 2–4 with the exception of the formation of lip 24. This final step is achieved by die stage 103 which effectively folds the upper end of edge 22 inwardly as material 44 passes therethrough. Die stage 103 should be capable of folding edge 22 along a line having any desired height to adjust the thickness of edge 22. For example, if building panels 10 are to be used for a roofing material, it would be desirable for edge 22 to have a length of approximately 1 ⅛ inches. On the other hand, if building panels 10 are to be used for exterior siding or interior paneling, the length of edge 22 should be shorter, approximately three-fourths inches.

Referring now to FIGS. 8, 12, 13, and 14, die stage 103 consists of a crimping unit mounted on a channel 220 positioned immediately above channel 112 so that material 44 leaving rollers 151 and 152 of die stage 102 is immediately directed into crimping stage 103. Basically, crimping stage 103 includes a generally U-shaped support 221 forming a slot 222. A roller 223 is mounted for rotation on a shaft 224, roller 223 having a first, large diameter section 225 which extends into slot 222 in support 221, and a second, small diameter section 226 which extends externally of support 221. As seen most clearly in FIG. 13, crimping stage 103 is adapted to be positioned so that edge 22 of material 44 passes between the outer periphery of section 226 of roller 223 and the lower edge 227 of support 221. When this occurs, section 225 of roller 223 folds the upper end of edge 22 into slot 222 to form lip 24. In addition, by making support 221 and roller 223 vertically moveable relative to channel 220 and material 44, the size of lip 24 may be readily adjusted.

Suitable apparatus for the construction of crimping unit 103 is shown in FIGS. 12, 13, and 14. More specifically, crimping unit 103 includes a rectangular, hollow housing 228 which is enclosed at the upper and lower ends thereof and which is connected to the inner side of channel 220 by bolts 229. Housing 228 supports bearings 230 and 231 at the upper and lower ends thereof, respectively, bearings 230 and 231 supporting shaft 224 not only for rotation but for vertical movement. Extending downwardly from the bottom of housing 228 is an externally threaded sleeve 232 through which the bottom of shaft 224 extends. The lower end of shaft 224 is connected via a bearing 233 to a hand wheel 234. Bearing 233 supports shaft 224 for rotation only. Hand wheel 234 includes an internally threaded section 207 which engages the threads on sleeve 232. Accordingly, by rotating hand wheel 234 relative to housing 228, hand wheel 234 and shaft 224 may be moved downwardly from the extreme uppermost position shown in FIG. 13. Hand wheel 234 may then be locked relative to sleeve 232 in any convenient manner, such as by passing a set screw 208 through section 207 thereof.

In order to move support 221 and roller 223 downwardly with shaft 224, the upper end of shaft 224 may be connected by a bearing 235 to support 221, bearing 235 permitting rotation only of shaft 224 relative to member 221. In addition, roller 225 is fixedly connected to shaft 224. In order to prevent rotation of support 221 when shaft 224 rotates, support 221 includes an arm 236 which extends into a vertical slot 237 in a bracket 238 connected to channel 220 by bolts 239. Accordingly, support 221 may move vertically relative to bracket 238 but may not rotate relative thereto.

As explained previously, rotation of hand wheel 234 moves hand wheel 234 and shaft 224 vertically relative to housing 228 and sleeve 232, shaft 224 moving support 221 and roller 223 therewith to adjust the length of lip 24 relative to edge 22. In order to transmit rotary motion to shaft 224, crimping unit 103 may include a gear 240, the teeth 241 of which are positioned at a 45° angle relative to the axis thereof. Gear 240 may have an axial bore 242 therethrough for receipt of shaft 224. By cutting a longitudinal keyway 243 in shaft 224 and providing bore 242 of gear 240 with a radially inwardly extending key 244, gear 240 may be positively connected to shaft 224, as far as rotary motion is concerned, while still permitting longitudinal movement of shaft 224. The longitudinal position of gear 240 may be controlled by positioning a pair of spacers 245 and 246 between the upper and lower surfaces of gear 240, respectively, and bearings 230 and 231, respectively.

In order to drive gear 240 and shaft 224, crimping stage 102 may include a second gear 247, the teeth 248 thereof being positioned at a 45° angle relative to the axis thereof for mating with teeth 241 of gear 240 so that the axes of rotation of gears 240 and 247 are spaced by an angle of 90° relative to each other. With this arrangement, gear 247 may be connected to one end of a drive shaft 249 which extends through the sides of housing 228 and channel 251 and which is supported thereby by means of bearings 250 and 350, respectively, the latter not being shown. Shaft 249 would be driven by motor 185 by means of a chain 351, a gear 352 connected to the other end of drive shaft 249, and a similar gear (not shown) connected to shaft 186 to insure that the speed of rotation of shaft 224 is the same as the speed with which material 44 exits from die stages 101 and 102.

When material 44 leaves crimping stage 103, it has the desired surface pattern and cross-sectional shape, such as that shown in FIGS. 3-4, although the material will be inverted with respect to the showings in FIGS. 3 and 4. Finally, the material is traveling in a direction transverse to the grain ridges and grooves 21, as indicated by an arrow A in FIG. 3.

It now becomes necessary to provide a horizontal moving support for material 44 during stages 34-36. This may be achieved most simply by use of a conventional conveyor belt, one end of which is shown in FIGS. 1 and 15. More specifically, a second channel 251 is positioned facing channel 220, but spaced therefrom by an amount equal to the spacing between channels 112 and 113. Channels 220 and 251 are supported above channels 112 and 113, respectively, by legs 268 and spacers 269 connected to base 39 and channels 112 and 113, respectively. Channels 220 and 251 support bearings 252 and 253, respectively, which support the opposite ends of a rotatable shaft 254. Mounted for rotation with shaft 254 is a pair of spaced cog wheels 255 for supporting one end of a continuous conveyor belt 256. According to the preferred embodiment of the present invention, belt 256 is a conventional, all-metal belt which has a large number of wheels 257 connected to the opposite edges thereof by means of rods 276 and studs 277 and which extend outwardly therefrom. In this manner, cog wheels 255, which engage rods 276, together with a second, identical pair of cog wheels, to be described hereinafter, support the opposite ends of belt 256. Since, as will appear more fully hereinafter, belt 256 is quite long, wheels 257 support the top and bottom of the length of belt 256. The lower set of wheels 257 may roll along the lower lip of channels 220 and 251 whereas the pair of L-shaped brackets 258 and 259 may be connected adjacent the upper ends of channels 220 and 251, respectively, for supporting the upper set of wheels 257. The manner of driving belt 256 will be described more fully hereinafter.

Shaft 254 is positioned along channels 220 and 251 at a point directly after crimping stage 103 so that the material leaving crimping stage 103 immediately comes to rest on belt 256. Therefore, material 44 is ready for conduction to stage 34 where the plastic material is injected in a fluid state onto face layer 12 while face layer 12 continues to move linearly in a horizontal plane on conveyor belt 256. With reference to FIGS. 12 and 15, stage 34 may consist, most simply, of a housing 260 having side walls 261 and 262 which are connected to the sides of channels 220 and 251, respectively. Extending between side walls 261 and 262 is a front wall 263, a back wall 264, and a top wall 265. Walls 263 and 264 extend across the top of conveyor belt 256 and material 44 and are open at the bottoms thereof, at 266 and 267, respectively, for passage of conveyor belt 256 and material 44 thereunder. In this manner, walls 261–265 form a housing which entirely surrounds the area above the moving material 44.

Positioned within housing 260 are a plurality of spray nozzles 270 which may be supported on a wall 271 connected to side walls 261 and 262, front wall 263 and top wall 265. Each of spray nozzles 270 includes three input lines 272–274 and is operative to direct a spray 275 of liquid material onto material 44, entirely covering the surface thereof. As explained previously, base layer 11 is formed from a synthetic resin plastic material such as polyurethane foam. Such a foam is well known and is formed upon the mixing of two chemical ingredients, which may be supplied to spray nozzles 270 by means of input lines 272 and 273. Input line 274 would be a source of air for creating the desired spray 275. Also as mentioned previously, it is preferred to employ a polyurethane foam which is self-extinguishing. Accordingly, a suitable fire retardant chemical, such as an isocyanate compound, would be included in one of the compounds in lines 272 or 273. Finally, a bonding agent would be included in one of the chemicals so that the formed base layer 11 is tightly bonded to face layer 12.

When material 44 reaches stage 34, it is still quite hot as a result of coating and painting stages 31 and 32. Accordingly, when the plastic material in a fluid state makes contact with material 44, a thin crust of the plastic material is activated and hardened very rapidly, before the complete cellular structure may be formed. However, except for this thin crust adjacent material 44, the plastic begins to grow normally. On the other hand, it is desirable, in order to speed up the manufacturing process, to have base layer activate as rapidly as possible. It is well known that the application of heat causes an acceleration of this process. In the present invention, heat is supplied by means of the heated material 44 and this tends to accelerate the activation of base layer 11. It may also be desirable to heat the chemicals before application to spray nozzles 270 to further accelerate the process. The stages that follow will also add to this acceleration of the activation process.

During foam injection stage 34, face layer 12 is continuously moving in a horizontal plane, under control of conveyor belt 256. Therefore, material 44, after receiving the sprayed foam material, passes under the bottom edge of wall 265 of housing 260 and is ready for application to stage 35 where the plastic material is activated while the cross-sectional shape and crust 15 is simultaneously created. In stage 35, the vertical growth of base layer 11 should be limited to the area encompassed by the outer end of edge 23 and lip 24. This may be achieved by positioning a surface immediately above material 44, in contact with the outer end of edge 23 and lip 24. By further applying heat to such a surface, two desirable effects may be achieved. In the first instance, such heat would accelerate the rise time and activation of the plastic material which therefore ages at a rate much faster than normal. In addition, when the growing plastic material forming base layer 11 contacts this heated surface, a thin crust at the upper end thereof sets very rapidly before the complete cellular structure is formed. Accordingly, crust 15, identical to crust 14, is formed on the other side of base layer 11, the result being a sandwich panel effect including central cellular structure 16 having hard crusts 14 and 15 on opposite sides thereof.

Referring now to FIGS. 16, 17, and 18, stage 35 includes side channels 220 and 251 which extend the entire length thereof and support conveyor belt 256. More specifically, extending through the other ends of channel 220 and 251 are a second pair of bearings 280 and 281, respectively, which support the opposite ends of a rotatable shaft 282. Mounted for rotation with shaft 282 is a pair of cog wheels 283 which support the other end of conveyor belt 256. Cog wheels 283 are positioned so as to engage rods 276 which connect wheels 257 to the sides of conveyor belt 256. Accordingly, by rotating shaft 282, cog wheels 283 are rotated, driving rods 276, wheels 257 and conveyor belt 256 therewith.

In order to insure a positive drive between conveyor belt 256 and material 44, conveyor belt 256 is adapted to have positioned on the outer surface thereof a plurality of metallic ridges 287, each of ridges 287 having a configuration adapted to extend into grooves 21 in face layer 12. As with face layer 12, ridges 287 have a maximum depth for a portion of the length thereof and then are gradually tapered out. Ridges 287 are positioned on conveyor belt 256 in parallel spaced relationship, with the spacing therebetween equal to the spacing between consecutive grooves 21 in face layer 12.

According to the embodiment of FIGS. 16–18, the vertical growth of base layer 11 is limited by positioning a moving surface immediately above material 44, in contact with the outer end of edge 23 and lip 24. This is achieved by use of a second conveyor belt 290 which is positioned directly above conveyor belt 256 and driven synchronously therewith. Conveyor belt 290 must be made from a different material then belt 256 since belt 290 will actually contact base layer 11. Therefore, if belt 290 were made of metal, base layer 11 would bond thereto. Accordingly, belt 290 may be made from a fibrous or woven material having a plastic coating thereon, such as teflon, to prevent bonding of layer 11 thereto. For supporting conveyor belt 290, stage 35 includes a pair of horizontally spaced, vertical upright members 291, which may be connected to channel 220, and an identical pair of horizontally spaced, vertical upright members 292, which may be connected to channel 251. Uprights 291 and 292 are arranged in pairs and connected at the upper ends thereof by plates 289. Since each of upright members 291 and 292 are identical, an explanation of one will suffice to explain all.

As seen most clearly in FIGS. 16 and 18, each of upright members 291 and 292 includes a slot 293 at the upper end thereof for receiving and supporting for vertical movement relative thereto a bearing support member 294. Support members 294 extend on opposite sides of upright members 291 and 292 and have vertical grooves 288 on opposite sides thereof for the upper ends 285 and 286 of each of uprights 291 and 292. Each of members 294 supports a bearing 295, bearings 295 supporting opposite ends of a pair of shafts 296. As will appear more fully hereinafter, each of bearings 295 is a self-aligning bearing which permits rotation of shafts 296 regardless of the angular orientation thereof relative to support 294. In any event, shafts 296 support a pair of drums 297 which support the opposite ends of conveyor belt 290.

Since the length of edge 23 of face layer 12 is always smaller than the length of edge 22 of face layer 12, the plane of conveyor belt 297 must be at a slight angle relative to the plane of conveyor belt 256, as shown in FIG. 17, so that the bottom half of conveyor belt 297 may simultaneously contact the outer end of edge 23 and lip 24. This is achieved by connecting support members 294 to one ends of a plurality of threaded shafts 310 which extend through threaded openings 298 in plates 289, above slots 293 in upright members 291 and 292, the other ends of shafts 310 being connected to hand wheels 299. Accordingly, by adjusting hand wheels 299 connected to upright members 291 relative to hand wheels 299 connected to upright members 292, one end of shaft 296 and drum 297 may be elevated relative to the other end thereof to permit the desired angle between conveyor belts 290 and 256. It is this difference in vertical height between support members 294 at the front and back of stage 35 which requires bearings 295 to be self-aligning bearings. Finally, when the desired vertical positions of support members 294 are located, the positions of shafts 310 may be fixed by tightening a plurality of lock nuts 300 against the upper ends of plates 289.

Referring now to FIGS. 16 and 17, it will be apparent that the lower half of conveyor belt 290 must be supported against vertical movement between the opposite ends thereof in order to withstand the pressure created during the formation of base layer 11. This is achieved by positioning a plurality of rollers 301 directly above the lower portion of conveyor belt 290, rollers 301 being horizontally spaced and being aligned with their axes perpendicular to the direction of motion of belt 256. The opposite ends of rollers 301 are connected by suitable lock nuts 302 to a pair of channels 303 and 304. Channel 303 extends parallel to and above channel 220 whereas channel 304 extends parallel to and above channel 251. It is obvious that the opposite ends of channels 303 and 304 must be connected in such a manner that they are vertically moveable with support members 294 so as to maintain rollers 301 always immediately above and in contact with the lower half of conveyor belt 290. This may be achieved most simply by connecting the opposite ends of channels 303 and 304 to support members 294. As shown in FIG. 18, a bolt 305 may be extended through each of support members 294 and held in position by means of a nut 306 so that the shafts of bolts 305 extend inwardly of support members 294. The shafts of bolts 305 may then extend through openings 307 in the opposite ends of each of channels 303 and 304. A connection which will prevent linear movement of channels 303 and 304 may be achieved by positioning a pair of nuts 308 on bolt 307, on opposite sides of channels 303 and 304. However, to permit a slight amount of rotation of rollers 301 and channels 303 and 304 relative to to bolts 305, a compressible rubber washer 309 may be positioned between each of nuts 308 and channels 303 and 304. Accordingly, rubber washers 309 permit limited angular rotation of channels 303 and 304 relative to bolts 305 to permit rotation of rollers 301 with drum 297 and conveyor belt 290.

As shown in FIGS. 16–18, each of channels 303 and 304 supports a second channel 313 and 314, respectively, immediately thereabove and parallel thereto. Channel 314 may be held above channel 304 and channel 313 may be held above channel 303 by use of a plurality of spacers 315 therebetween and welded thereto. Channels 313 and 314 may be utilized to support a plate 316 therebetween, plate 316 running essentially the entire length of conveyor belt 290, between upright members 291 on one side and 292 on the other side of stage 35. Accordingly, and as shown in FIGS. 16 and 17, the upper half of conveyor belt 290 slides across the top of plate 316 and is prevented from sagging which would normally occur due to the length thereof.

Conveyor belts 256 and 290 may be driven synchronously and in opposite directions in the same manner as drums 104 and 105 or drums 151 and 152. Since the mechanism may be identical, no detailed discussion thereof is necessary other than to mention the fact that a gear 320 is connected to shaft 282, a gear 321 is connected to shaft 296, and gears 320 and 321 are driven together by means of idler gears 322 and 322. Accordingly, by driving shaft 282 in any suitable manner, synchronously with the driving of die stages 101, 102, and 103, conveyor belt 256 and 290 are driven in opposite directions, as shown by arrows C and D, respectively, in FIG. 16, pulling material 44 through stage 35. Since the portion of shaft 296 between upright members 291 and 292 is angularly adjustable, bearing 295 may also include a flexible joint so that the portion of shaft 296 connected to gear 321 remains horizontal.

As mentioned previously, by applying heat to conveyor belt 290, two desirable effects may be achieved, namely accelerating the rise time of base layer 11 and creating a crust 15, identical to crust 14, on the upper side of base layer 11. According to the embodiment of FIGS. 16–18, this may be achieved by positioning an elongated hood 330 above the upper portion of conveyor belt 290, hood 330 being connected by brackets 332 to plates 289 and supporting a plurality of heating rods 331. Heating rods 331 then serve the function of heating conveyor belt 290 which achieves the purposes discussed previously.

The length of conveyor belts 256 and 290 will be selected so that the foam is fully activated and grown to its capacity at the end of stage 35. Accordingly, at the time face layer 12 and base layer 11 leaves the end of conveyor belts 256 and 290, the process of fabrication of panel 10 is essentially complete and the structure has the appearance shown in FIGS. 2–4, with the exception that base layer 11 and face layer 12 are in one continuous piece. The composite structure may then be subjected to stage 36 which may, most simply, be an elongated oven, open at opposite ends thereof, and containing a conveyor belt of its own, where base layer 11 continues to cure and undergoes an aging process. Accordingly, upon exiting from stage 36, the building panel is completed and ready for use. Accordingly, the structure is subjected to an eighth stage 37 where the continuous length of face layer 12 and base layer 11 is cut into convenient lengths, such as 4 inch panels 10. Thereafter, panels 10 may be passed onto a final stage 38 for packaging of a predetermined number of panels 10 into a unit suitable for shipment.

During the discussion of the operation of stage 35 where the plastic material injected during stage 34 is permitted to activate, it was mentioned that conveyor belt 256 supports face layer 12 and that conveyor belt 290 limits the vertical growth of base layer 11 in the area encompassed by the outer end of edge 23 and lip 24. However, it should also be noted that the activation of the plastic material will also apply a pressure to edges 22 and 23. In order to prevent edges 22 and 23 from being bent outwardly by this pressure, means should be provided for supporting such edges. One convenient method is shown in FIGS. 15 and 17 and includes a pair of rigid or semi-rigid strips 340 and 341 which are connected to conveyor belt 256. Each of strips 340 and 341 would have a length equal to the total length of conveyor belt 256 and would be positioned parallel to the length thereof and spaced by an amount equal to the width of face layer 12, between edges 22 and 23. By making strips 340 and 341 of rigid metal or semi-rigid, hard rubber and by attaching such strips to conveyor belt 256, as shown, a suitable side support for edges 22 and 23 is provided. Alternatively, rollers could be attached to channels 220 or 251 to support edges 22 or 23.

It can therefore be seen that according to the present invention, there is provided a building material for roofing, exterior siding, interior paneling, or other equivalent exterior and interior uses which is effective in solving or minimizing all of the problems discussed previously. The present building material uses new, highly available, synthetic materials, such as aluminum and polyurethane foam, that alleviate, in great measure, the critical demand for wooden building materials. The life span of the present material is substantially greater than that of wooden structures, estimated to exceed 40 years. The present building material is fire-resistant and self-extinguishing in addition to producing no toxic fumes. In addition, the present building material has a high degree of thermal insulation to both heat and cold. When used as a roofing structure, panels 10 not only block the solar heat and cold, but prevent penetration into the attic structure of a home.

The present building material uses a polyurethane closed cell foam which has been scientifically proven to be one of the best materials for deadening sound. The soundproofing effect of panels 10 is approximately equal to three feet of solid brick. As described in accordance with the preferred embodiment of apparatus for building panels 10, panels 10 may be constructed to simulate the surface grain and appearance of any naturally-occurring building material. Although the preferred embodiment was described with respect to the heavy rustic shake shingle, it will be apparent to those skilled in the art that the present apparatus is equally capable of creating any desired surface pattern simply by changing the pattern in die stages 101 and 102.

Panels 10 are extremely lightweight, will stand more punishment without damage, and will be much less apt to collapse from a quake shock. In snow areas where there is the weight build-up factor to be considered, panels 10 used for roofing are so much lighter than other roofing materials that they will support the difference in weight between themselves and heavier materials with the same substructure. Yet, panels 10 are exceedingly strong and will withstand as much abuse as any other roofing material and even more as other roofs age and shingles begin to curl, which is not the case with the present building material.

Panels 10, in addition to all of the other advantages, will prove to be the most inexpensive in the long run. Not only are the present synthetic building materials originally less expensive than existing materials, but the extra long life span, the improved insulation and soundproofing, the fire-resistance and ease of installation, all combine to decrease costs.

Panels 10 are so lightweight that they are easily handled and installed and no special equipment is necessary to hoist packages containing panels 10 onto roof 9. Since panels 10 have a length of several feet, installation is much faster than for individual shingles, thus cutting costs of installation. If the roof is damaged from falling objects, the damaged panel 10 can be easily repaired by replacing it with a new panel. In addition, holes up to 3 or 4 inches in diameter can be repaired by filling them with resin plastics and repainting them with matching existing colors.

While the invention has been described with respect to the preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

We claim:

1. A method of fabricating a building material comprising the steps of:

providing a face layer of sheet material;

passing said sheet material between at least a pair of male and female roller dies, said dies impressing in said face layer a pattern simulating the surface appearance of a naturally-occurring building material;

injecting onto said face layer a relatively thick layer of foamed, synthetic, plastic material in a fluid state, said plastic material including a bonding agent; and permitting said plastic material to activate and harden on said face layer to form asubstantially rigid base layer which is bonded to said face layer.

2. A method according to claim 1 wherein said plastic material undergoes a foaming action after application to said face layer.

3. A method according to claim 2 further comprising the step of:

heating said sheet material before said step of applying said plastic material whereby said plastic material forms a hard crust on the surface thereof in contact with said heated face layer.

4. A method according to claim 3 wherein said plastic material is sprayed against said face layer while the latter is supported at its back surface, and further comprising the step of:

passing said face layer and foaming plastic material beneath a heated surface, said heated surface limiting the rise of said plastic material and forming a hard crust on the surface thereof opposite to said face layer.

5. A method according to claim 1 wherein said pair of dies impress said pattern in said face layer uniformly across the width thereof and further comprising the step of:
passin said sheet material between a second pair of male and female roller dies, said second pair of dies gradually removing said pattern from adjacent the center of said face layer to one side thereof.

6. A method according to claim 5 wherein said first and second pairs of dies change the cross-sectional shape of said sheet material by bending the marginal edges thereof at an angle of 90° relative to the remainder of said face layer, said marginal edge adjacent said one side of said face layer being shorter than the other marginal edge.

7. A method according to claim 6 further comprising the step of:
bending the outer edge of the longer of said marginal edges at an angle of 90° relative thereto so as to be parallel to the said remainder of said face layer.

8. A method according to claim 1 wherein said step of providing a face layer comprises the step of:
providing said sheet material in continuous ribbon form.

9. A method according to claim 8 further comprising the step of:
cutting said sheet material with the hardened plastic material bonded thereon into panels.

10. A method according to claim 1 further comprising the steps of:
coating said face layer of sheet material with a suitable preserving material; and
drying said coated face layer.

11. A method according to claim 10 further comprising the steps of:
coating one side of said face layer with a fire-resistant, weather-resistant, exterior paint; and
baking said coated face layer for drying thereof, said coating with paint and baking steps being performed immediately after said steps of coating with a preserving material and drying.

12. Apparatus for fabricating a building material comprising:
means for providing a face layer of sheet material in continuous ribbon form;
means for supporting said face layer horizontally;
means for altering the surface pattern of said face layer;
means for injecting onto said face layer a relatively thick layer of foamed, synthetic, plastic material in a fluid state, said plastic material activating and hardening on said face layer to form a substantially rigid base layer which is bonded to said face layer; and
means for limiting the vertical growth of said plastic material to form a composite structure having a desired cross-sectional shape.

13. Apparatus according to claim 12 further comprising:
means operative prior to said supporting means for coating both sides of said face layer with a suitable preserving material; and
means for subsequently drying said coated face layer.

14. Apparatus according to claim 13 further comprising:
means operative after said drying means for coating the lower side of said face layer with a fire-resistant, weather-resistant, exterior paint; and
means for subsequently baking said paint coated face layer for drying thereof.

15. Apparatus according to claim 12 wherein said altering means comprises:
a first die stage including a first pair of male and female roller dies, said face layer of sheet material passing between said first pair of roller dies, said roller dies impressing in said face layer a pattern simulating the surface appearance of a naturally-occurring building material.

16. Apparatus according to claim 15 wherein said first pair of roller dies impress said pattern in said face layer uniformly across the width thereof and wherein said altering means further comprises:
a second die stage including a second pair of male and female roller dies, said face layer of sheet material leaving said first die stage passing between said second pair of roller dies, said second pair of roller dies gradually removing said pattern formed by said first die stage from adjacent the center of said face layer to one side thereof so that said surface pattern has a maximum depth at the other side of said sheet material and a minimum depth at said one side thereof.

17. Apparatus according to claim 16 wherein said means for altering the surface pattern of said face layer is simultaneously operative to alter the cross-sectional shape of said sheet material, said first die stage including means for bending the marginal edges of said face layer upwardly at an angle of 45° relative to the remainder of said face layer and said second die stage including means for bending said marginal edges to 90°.

18. Apparatus according to claim 17 further comprising:
a third die stage including means for bending the outer edge of said marginal edge at said other side of said sheet material inwardly at an angle of 90° relative thereto so as to be parallel to said remainder of said face layer.

19. Apparatus according to claim 18 wherein said third die stage includes:
means for adjusting the height of the line along which said outer edge of said marginal edge is bent inwardly.

20. Apparatus according to claim 12 further comprising:
means for altering the cross-sectional shape of said face layer.

21. Apparatus according to claim 12 wherein said plastic material undergoes a foaming action after application to said face layer and further comprising:
means for heating said sheet material before injection of said plastic material thereon whereby said plastic material forms a hard crust on the surface thereof in contact with said heated face layer.

22. Apparatus according to claim 21 wherein said supporting means comprises:
a first horizontally movable conveyor belt, said conveyor belt moving said face layer past said injecting means; and wherein said limiting means comprises:
a second generally horizontally movable conveyor belt positioned parallel to and directly above said first conveyor belt, said plastic material rising until it contacts said second conveyor belt.

23. Apparatus according to claim 22 further comprising:
means for heating said second conveyor belt whereby said plastic material forms a hard crust on the surface thereof opposite to said face layer.

24. Apparatus according to claim 22 further comprising:
means for supporting said second conveyor belt, said means including means for adjusting the plane of movement of said second conveyor belt relative to said first conveyor belt to adjust the cross-sectional shape of said base layer.

* * * * *